US011884089B2

(12) United States Patent
Landa et al.

(10) Patent No.: US 11,884,089 B2
(45) Date of Patent: Jan. 30, 2024

(54) PRINTING SYSTEM

(71) Applicant: LANDA CORPORATION LTD., Rehovot (IL)

(72) Inventors: Benzion Landa, Nes Ziona (IL); Aharon Shmaiser, Rishon LeZion (IL); Itshak Ashkanazi, Rehovot (IL)

(73) Assignee: LANDA CORPORATION LTD., Rehovot (IL)

( * ) Notice: Subject to any disclaimer, the term of this patent is extended or adjusted under 35 U.S.C. 154(b) by 30 days.

(21) Appl. No.: 17/530,507

(22) Filed: Nov. 19, 2021

(65) Prior Publication Data

US 2022/0153048 A1 May 19, 2022

Related U.S. Application Data

(63) Continuation of application No. 16/901,856, filed on Jun. 15, 2020, now Pat. No. 11,214,089, which is a (Continued)

(30) Foreign Application Priority Data

Mar. 20, 2015 (GB) ................................ GB 1504719

(51) Int. Cl.
*B41M 5/025* (2006.01)
*B41J 2/01* (2006.01)

(52) U.S. Cl.
CPC .............. *B41M 5/0256* (2013.01); *B41J 2/01* (2013.01); *B41J 2002/012* (2013.01)

(58) Field of Classification Search
CPC ..... B41M 5/0256; B41J 2/01; B41J 2002/012
(Continued)

(56) References Cited

U.S. PATENT DOCUMENTS 3,935,055 A 1/1976 Carmien
4,204,471 A 5/1980 Becker
(Continued)

FOREIGN PATENT DOCUMENTS

CN 1305895 A 8/2001
CN 1543404 A 11/2004
(Continued)

OTHER PUBLICATIONS

CN102229294A Machine Translation (by EPO and Google)—published Nov. 2, 2011; Guangzhou Changcheng Ceramics Co Ltd.
(Continued)

*Primary Examiner* — Matthew Luu
*Assistant Examiner* — Alexander D Shenderov
(74) *Attorney, Agent, or Firm* — Momentum IP; Marc Van Dyke

(57) ABSTRACT

An intermediate transfer member (ITM) for use in a printing system to transport an ink image from an image forming station to an impression station for transfer of the ink image from the ITM onto a printing substrate, wherein the ITM is an endless flexible belt of substantially uniform width which, during use, passes over drive and guide rollers and is guided through at least the image forming station by means of guide channels that receive formations provided on both lateral edges of the belt, wherein the formations on a first edge differ from the formations on the second edge by being configured for providing the elasticity desired to maintain the belt taut when the belt is guided through their respective lateral channels.

2 Claims, 10 Drawing Sheets

Related U.S. Application Data continuation of application No. 16/433,970, filed on Jun. 6, 2019, now Pat. No. 10,730,333, which is a continuation of application No. 15/871,797, filed on Jan. 15, 2018, now Pat. No. 10,357,985, which is a continuation of application No. 15/439,966, filed on Feb. 23, 2017, now Pat. No. 9,914,316, which is a continuation of application No. 15/053,017, filed on Feb. 25, 2016, now Pat. No. 9,643,403, which is a continuation-in-part of application No. 14/382,758, filed as application No. PCT/IB2013/051718 on Mar. 5, 2013, now Pat. No. 9,290,016.

(60) Provisional application No. 61/640,493, filed on Apr. 30, 2012, provisional application No. 61/635,156, filed on Apr. 18, 2012, provisional application No. 61/619,546, filed on Apr. 3, 2012, provisional application No. 61/611,505, filed on Mar. 15, 2012, provisional application No. 61/611,286, filed on Mar. 15, 2012, provisional application No. 61/606,913, filed on Mar. 5, 2012.

(58) Field of Classification Search
USPC .......................................................... 347/102
See application file for complete search history.

(56) References Cited

U.S. PATENT DOCUMENTS 4,520,048 A 5/1985 Ranger
4,792,473 A 12/1988 Vitale
4,867,830 A 9/1989 Chung
5,320,214 A 6/1994 Kordis
5,683,841 A 11/1997 Kato
5,780,412 A 7/1998 Scarborough et al.
5,865,299 A 2/1999 Williams
6,318,853 B1 11/2001 Asano et al.
6,335,046 B1 1/2002 MacKey
6,405,006 B1 6/2002 Tabuchi
7,419,257 B2 9/2008 Mouri et al.
8,119,315 B1 2/2012 Heuft et al.
8,303,071 B2 11/2012 Eun
8,632,147 B2 1/2014 Onishi
9,044,932 B2 6/2015 Ohnishi et al.
9,227,429 B1 1/2016 LeStrange et al.
9,327,519 B1 5/2016 Larson et al.
9,969,182 B2 5/2018 Torisaka et al.
10,052,865 B2 8/2018 Goto
10,336,060 B2 7/2019 Liu
10,703,093 B2 7/2020 Karlinski et al.
11,214,089 B2 1/2022 Landa et al.
11,655,382 B2 5/2023 Landa et al.
2001/0033688 A1 10/2001 Taylor
2002/0061451 A1 5/2002 Kita et al.
2003/0007055 A1 1/2003 Ogawa
2003/0103128 A1 6/2003 Missell et al.
2004/0105971 A1 6/2004 Parrinello et al.
2004/0177779 A1 9/2004 Steffen et al.
2004/0221943 A1 11/2004 Yu et al.
2004/0249327 A1 12/2004 Sendijarevic et al.
2004/0265016 A1 12/2004 Kitani et al.
2005/0103437 A1 5/2005 Carroll
2005/0117859 A1 6/2005 Suzuki et al.
2006/0066704 A1 3/2006 Nishida
2006/0120740 A1 6/2006 Yamada et al.
2006/0175559 A1 8/2006 Fischer et al.
2007/0025740 A1 2/2007 Katoh et al.
2007/0229639 A1* 10/2007 Yahiro .................. B41J 2/0057 347/102
2008/0066277 A1 3/2008 Colson et al.
2008/0101895 A1 5/2008 Holcomb et al.
2008/0124158 A1 5/2008 Folkins
2008/0247780 A1 10/2008 Hara
2008/0295724 A1 12/2008 Lohweg et al.
2009/0073222 A1 3/2009 Hori
2009/0079784 A1* 3/2009 Chiwata ................. C09D 11/54 347/21
2009/0185204 A1 7/2009 Wu et al.
2010/0035501 A1 2/2010 Prudhomme et al.
2010/0123752 A1 5/2010 Eun et al.
2010/0247171 A1 9/2010 Ono et al.
2010/0300604 A1 12/2010 Goss et al.
2011/0069110 A1 3/2011 Matsumoto et al.
2011/0069117 A1 3/2011 Ohzeki et al.
2011/0069129 A1 3/2011 Shimizu
2011/0242181 A1 10/2011 Otobe
2011/0298884 A1 12/2011 Furuta
2012/0014726 A1 1/2012 Sekihara et al.
2012/0183756 A1 7/2012 Higuchi
2012/0236100 A1 9/2012 Toya
2012/0249630 A1 10/2012 Bugner et al.
2012/0280447 A1 11/2012 Kayanuma
2012/0314013 A1 12/2012 Takemoto et al.
2013/0011158 A1 1/2013 Meguro et al.
2013/0016156 A1* 1/2013 Ooishi .................. C09D 11/54 524/88
2013/0096871 A1 4/2013 Takahama
2013/0182045 A1 7/2013 Ohzeki et al.
2013/0229457 A1 9/2013 Yu
2013/0235139 A1 9/2013 Schnabel et al.
2013/0302065 A1 11/2013 Mori et al.
2014/0153956 A1 6/2014 Yonemoto
2014/0168313 A1 6/2014 Ramesh et al.
2014/0176641 A1 6/2014 Hawryschuk et al.
2014/0198162 A1 7/2014 DiRubio et al.
2014/0334855 A1 11/2014 Onishi et al.
2015/0022605 A1 1/2015 Mantell et al.
2015/0085038 A1 3/2015 Liu
2015/0097906 A1 4/2015 Beier et al.
2015/0165758 A1 6/2015 Sambhy et al.
2015/0273835 A1 10/2015 Arimizu et al.
2015/0315403 A1 11/2015 Song et al.
2015/0343797 A1 12/2015 Song et al.
2015/0375543 A1 12/2015 Barnett et al.
2016/0083609 A1 3/2016 Sisler et al.
2016/0250879 A1 9/2016 Chen et al.
2016/0274519 A1 9/2016 Lim et al.
2016/0378036 A1 12/2016 Onishi et al.
2017/0282599 A1 10/2017 Ido
2018/0149998 A1 5/2018 Furukawa
2018/0281382 A1 10/2018 Umezawa et al.
2018/0348672 A1 12/2018 Yoshida
2018/0348675 A1 12/2018 Nakamura et al.
2019/0094727 A1 3/2019 Landa et al.
2019/0232638 A1 8/2019 Ziegenbalg et al.
2020/0073301 A1 3/2020 Sakai et al.
2020/0361715 A1 11/2020 Meier
2020/0376860 A1 12/2020 Paker et al.
2021/0001622 A1 1/2021 Landa et al.
2021/0053341 A1 2/2021 Landa et al.
2021/0055666 A1 2/2021 Landa et al.
2021/0062021 A1 3/2021 Landa et al.
2021/0070083 A1 3/2021 Levanon et al.
2021/0095145 A1 4/2021 Landa et al.
2021/0146697 A1 5/2021 Landa et al.
2021/0182001 A1 6/2021 Levant
2021/0245528 A1 8/2021 Landa et al.
2021/0252876 A1 8/2021 Landa et al.
2021/0260869 A1 8/2021 Landa et al.
2021/0268793 A1 9/2021 Burkatovsky
2021/0283899 A1 9/2021 Landa et al.
2021/0309020 A1 10/2021 Siman Tov et al.
2021/0394531 A1 12/2021 Chechik et al.
2022/0016880 A1 1/2022 Landa et al.
2022/0016881 A1 1/2022 Shmaiser et al.
2022/0188050 A1 6/2022 Levant
2022/0274394 A1 9/2022 Chechik et al.
2022/0288947 A1 9/2022 Landa et al.
2022/0339927 A1 10/2022 Landa et al.
2022/0379598 A1 12/2022 Landa et al.
2022/0388315 A1 12/2022 Landa et al.
2023/0001710 A1 1/2023 Landa et al.

(56) References Cited

U.S. PATENT DOCUMENTS

| | | | |
|---|---|---|---|
| 2023/0166495 | A1 | 6/2023 | Burkatovsky |
| 2023/0202162 | A1 | 6/2023 | Landa et al. |
| 2023/0202209 | A1 | 6/2023 | Landa |

FOREIGN PATENT DOCUMENTS

| | | | |
|---|---|---|---|
| CN | 1555422 | A | 12/2004 |
| CN | 1680506 | A | 10/2005 |
| CN | 1703326 | A | 11/2005 |
| CN | 1961015 | A | 5/2007 |
| CN | 101096455 | A | 1/2008 |
| CN | 101248146 | A | 8/2008 |
| CN | 101433074 | A | 5/2009 |
| CN | 101592896 | A | 12/2009 |
| CN | 101820241 | A | 9/2010 |
| CN | 102229294 | A | 11/2011 |
| CN | 102300932 | A | 12/2011 |
| CN | 102341249 | A | 2/2012 |
| CN | 102529257 | A | 7/2012 |
| CN | 102566343 | A | 7/2012 |
| CN | 102673209 | A | 9/2012 |
| CN | 103568483 | A | 2/2014 |
| CN | 103627337 | A | 3/2014 |
| CN | 104015415 | A | 9/2014 |
| CN | 105844621 | A | 8/2016 |
| CN | 107111267 | A | 8/2017 |
| CN | 107879147 | A | 4/2018 |
| DE | 102012011783 | A1 | 12/2013 |
| EP | 0676300 | A2 | 10/1995 |
| EP | 0923007 | A2 | 6/1999 |
| EP | 1271263 | A1 | 1/2003 |
| EP | 3260486 | A1 | 12/2017 |
| JP | 48043941 | | 12/1973 |
| JP | S63274572 | A | 11/1988 |
| JP | H01142811 | A | 6/1989 |
| JP | H05249870 | A | 9/1993 |
| JP | H08272224 | A | 10/1996 |
| JP | H09174646 | A | 7/1997 |
| JP | H09300678 | A | 11/1997 |
| JP | H10130597 | A | 5/1998 |
| JP | H11138740 | A | 5/1999 |
| JP | 2000094660 | A | 4/2000 |
| JP | 2000141883 | A | 5/2000 |
| JP | 2000190468 | A | 7/2000 |
| JP | 2000337464 | A | 12/2000 |
| JP | 2000343025 | A | 12/2000 |
| JP | 2002049211 | A | 2/2002 |
| JP | 2003076159 | A | 3/2003 |
| JP | 2003094795 | A | 4/2003 |
| JP | 2003107819 | A | 4/2003 |
| JP | 2003227549 | A | 8/2003 |
| JP | 2004011263 | A | 1/2004 |
| JP | 2004167902 | A | 6/2004 |
| JP | 2004340983 | A | 12/2004 |
| JP | 2005017472 | A | 1/2005 |
| JP | 2005224737 | A | 8/2005 |
| JP | 3712547 | B2 | 11/2005 |
| JP | 2007079159 | A | 3/2007 |
| JP | 2007111891 | A | 5/2007 |
| JP | 2008082820 | A | 4/2008 |
| JP | 2008137146 | A | 6/2008 |
| JP | 2009000916 | A | 1/2009 |
| JP | 2009154377 | A | 7/2009 |
| JP | 2009532240 | A | 9/2009 |
| JP | 2009226805 | A | 10/2009 |
| JP | 2009226890 | A | 10/2009 |
| JP | 2009227909 | A | 10/2009 |
| JP | 2009240925 | A | 10/2009 |
| JP | 2009258587 | A | 11/2009 |
| JP | 2009271422 | A | 11/2009 |
| JP | 2009279808 | A | 12/2009 |
| JP | 2010030300 | A | 2/2010 |
| JP | 2010076214 | A | 4/2010 |
| JP | 4562388 | B2 | 10/2010 |
| JP | 2010240897 | A | 10/2010 |
| JP | 2011031619 | A | 2/2011 |
| JP | 2011064850 | A | 3/2011 |
| JP | 2011168024 | A | 9/2011 |
| JP | 2012081770 | A | 4/2012 |
| JP | 2013104044 | A | 5/2013 |
| JP | 2014008609 | A | 1/2014 |
| JP | 2014073675 | A | 4/2014 |
| JP | 2014131843 | A | 7/2014 |
| JP | 2015202616 | A | 11/2015 |
| JP | 2016074206 | A | 5/2016 |
| JP | 2016093999 | A | 5/2016 |
| JP | 2016179678 | A | 10/2016 |
| JP | 2017093178 | A | 5/2017 |
| JP | 2018017429 | A | 2/2018 |
| JP | 2020014350 | A | 1/2020 |
| WO | 2015026864 | A1 | 2/2015 |
| WO | 2015036865 | A1 | 3/2015 |
| WO | 2017208152 | A1 | 12/2017 |
| WO | 2018100541 | A1 | 6/2018 |
| WO | 2019012456 | A1 | 1/2019 |
| WO | 2019111223 | A1 | 6/2019 |
| WO | 2020003088 | A1 | 1/2020 |
| WO | 2020136517 | A1 | 7/2020 |
| WO | 2020141465 | A1 | 7/2020 |
| WO | 2021137063 | A1 | 7/2021 |

OTHER PUBLICATIONS

CN102300932A Machine Translation (by EPO and Google)—published Dec. 28, 2011; Yoshida Hiroaki et al.
CN103568483A Machine Translation (by EPO and Google)—published Feb. 12, 2014; Anhui Printing Mechanical & Electrical Co Ltd.
CN103627337A Machine Translation (by EPO and Google)—published Mar. 12, 2014; Suzhou Banlid New Material Co Ltd.
CN107111267A Machine Translation (by EPO and Google)—published Aug. 29, 2017; Hewlett Packard Indigo BV.
CN1555422A Machine Translation (by EPO and Google)—published Dec. 15, 2004; Noranda Inc.
CN1680506A Machine Translation (by EPO and Google)—published Oct. 12, 2005; Shinetsu Chemical Co [JP].
Co-pending U.S. Appl. No. 17/155,121, filed Jan. 22, 2021.
Co-pending U.S. Appl. No. 17/382,334, inventor Landa; Benzion, filed Jul. 21, 2021.
Co-pending U.S. Appl. No. 17/414,087, inventors Benzion; Landa et al., filed Jun. 15, 2021.
Co-pending U.S. Appl. No. 17/438,497, filed Sep. 13, 2021.
Co-pending U.S. Appl. No. 17/507,758, filed Oct. 21, 2021.
Co-pending U.S. Appl. No. 17/522,383, filed Nov. 9, 2021.
Co-pending U.S. Appl. No. 17/551,219, filed Dec. 15, 2021.
Co-pending U.S. Appl. No. 17/583,372, filed Jan. 25, 2022.
IP.com search (Year: 2021).
JP2000343025A Machine Translation (by EPO and Google)—published Dec. 12, 2000; Kyocera Corp.
JP2002049211A Machine Translation (by EPO and Google)—published Feb. 15, 2002; PFU Ltd.
JP2003076159A Machine Translation (by EPO and Google)—published Mar. 14, 2003, Ricoh KK.
JP2003094795A Machine Translation (by EPO and Google)—published Apr. 3, 2003; Ricoh KK.
JP2004011263A Machine Translation (by EPO and Google)—published Jan. 15, 2004; Sumitomo Denko Steel Wire KK.
JP2004167902A Machine Translation (by EPO and Google)—published Jun. 17, 2004; Nippon New Chrome KK.
JP2004340983A Machine Translation (by EPO and Google)—published Dec. 2, 2004; Ricoh KK.
JP2007079159A Machine Translation (by EPO and Google)—published Mar. 29, 2007; Ricoh KK.
JP2008137146A Machine Translation (by EPO and Google)—published Jun. 19, 2008; CBG Acciai SRL.
JP2009226805A Machine Translation (by EPO and Google)—published Oct. 8, 2009; Fuji Xerox Co Ltd.
JP2009226890A Machine Translation (by EPO and Google)—published Oct. 8, 2009; Fuji Xerox Co Ltd.

(56) References Cited

OTHER PUBLICATIONS

JP2009532240A Machine Translation (by EPO and Google)—published Sep. 10, 2009; Aisapack Holding SA.
JP2010030300A Machine Translation (by EPO and Google)—published Feb. 12, 2010; Xerox Corp.
JP2010240897A Machine Translation (by EPO and Google)—published Oct. 28, 2010; Toppan Printing Co Ltd.
JP2011031619A Machine Translation (by EPO and Google)—published Feb. 17, 2011; Xerox Corp.
JP2011064850A Machine Translation (by EPO and Google)—published Mar. 31, 2011; Seiko Epson Corp.
JP2014131843A Machine Translation (by EPO and Google)—published Jul. 17, 2014; Ricoh Co Ltd.
JP2016093999A Machine Translation (by EPO and Google)—published May 26, 2016; Canon KK.
JP4562388B2 Machine Translation (by EPO and Google)—published Oct. 13, 2010; SK Kaken Co Ltd.
JPH09300678A Machine Translation (by EPO and Google)—published Nov. 25, 1997; Mitsubishi Electric Corp.
JPH11138740A Machine Translation (by EPO and Google)—published May 25, 1999; Nikka KK.
Xiameter™ "OFS-0777 Siliconate Technical Data Sheet," Dec. 31, 2017, 5 pages. [Retrieved from the internet on Oct. 13, 2021]: https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf.
CN101096455A Machine Translation (EPO, PlatPat and Google) published on Jan. 2, 2008 Fujifilm Corp.
CN101248146A Machine Translation (EPO, PlatPat and Google) published on Aug. 20, 2008 Ricoh Kk.
CN101433074A Machine Translation (by EPO and Google)—published May 13, 2009; Kyocera Mita Corp [JP].
CN101592896A Machine Translation (by EPO and Google)—published Dec. 2, 2009; Canon KK.
CN101820241A Machine Translation (by EPO and Google)—published Sep. 1, 2010; Canon KK.
CN102341249A Machine Translation (EPO, PlatPat and Google) published on Feb. 1, 2012 Eastman Kodak Co.
CN102529257A Machine Translation (by EPO and Google)—published Jul. 4, 2012; Nippon Synthetic Chem Ind.
CN102566343A Machine Translation (by EPO and Google)—published Jul. 11, 2012; Canon KK.
CN102673209A Machine Translation (by EPO and Google)—published Sep. 19, 2012; Wistron Corp.
CN104015415A Machine Translation (by EPO and Google)—published Sep. 3, 2014; Avery Dennison Corp.
CN105844621A Machine Translation (by EPO and Google)—published Aug. 10, 2016; Fuyang Feiyang Printing Co Ltd.
CN107879147A Machine Translation (by EPO and Google)—published Apr. 6, 2018; Brother Ind Ltd.
CN1305895A Machine Translation (by EPO and Google)—published Aug. 1, 2001; Imaje SA [FR].
CN1543404A Machine Translation (by EPO and Google)—published Nov. 3, 2004; 3M Innovative Properties Co [US].
CN1703326A Machine Translation (by EPO and Google)—published Nov. 30, 2005; Nissha Printing [JP].
CN1961015A Machine Translation (EPO, PlatPat and Google) published on May 9, 2007 Dainippon Ink Chemicals.
Co-pending U.S. Appl. No. 17/788,335, inventors Benzion; Landa et al., filed Jun. 23, 2022.
Co-pending U.S. Appl. No. 17/963,225, inventors Burkatovsky; Vitaly et al., filed Oct. 11, 2022.
IP.com search (Year: 2022).
JP2000094660A Machine Translation (by EPO and Google)—published Apr. 4, 2000; Brother Ind Ltd.
JP2000141883A Machine Translation (EPO, PlatPat and Google) published on May 23, 2000 Ricoh KK.
JP2000190468A Machine Translation (EPO, PlatPat and Google) published on Jul. 11, 2000 Brother Ind Ltd.
JP2000337464A Machine Translation (by EPO and Google)—published Dec. 5, 2000; Fuji Xerox Co Ltd.
JP2003107819A Machine Translation (by EPO and Google)—published Apr. 9, 2003; Kanegafuchi Chemical Ind.
JP2004117118A Machine Translation (by EPO and Google)—published Apr. 15, 2004; Nidec Copal Corp.
JP2005224737A Machine Translation (by EPO and Google)—published Aug. 25, 2005; Mitsubishi Paper Mills Ltd.
JP2006256087 Machine Translation (by EPO and Google)—published Sep. 28, 2006; Ricoh Printing Sys Ltd.
JP2008082820A Machine Translation (by EPO and Google)—published Apr. 10, 2008; Ricoh KK.
JP2009154377A Machine Translation (by EPO and Google)—published Jul. 16, 2009; Fujifilm Corp.
JP2009227909A Machine Translation (EPO, PlatPat and Google) published on Oct. 8, 2009 Fujifilm Corp.
JP2009240925A Machine Translation (by EPO and Google)—published Oct. 22, 2009; Fujifilm Corp.
JP2009258587A Machine Translation (by EPO and Google)—published Nov. 5, 2009; Fuji Xerox Co Ltd.
JP2009271422A Machine Translation (by EPO and Google)—published Nov. 19, 2009; Ricoh KK.
JP2009279808A Machine Translation (by EPO and Google)—published Dec. 3, 2009; Fuji Xerox Co Ltd.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016179678A Machine Translation (EPO, PlatPat and Google) published on Oct. 13, 2016 Xerox Corp.
JP2017093178A Machine Translation (EPO and Google) published on May 25, 2017 Samsung Electronics Co Ltd.
JP2018017429A Machine Translation (by EPO and Google)—published Feb. 1, 2018; Rinnai KK.
JP2020014350A Machine Translation (by EPO and Google)—published Jan. 23, 2020; Toshiba Mitsubishi Elec Ind.
JP48043941 Machine Translation (by EPO and Google)—published Dec. 21, 1973.
JPH10130597A Machine Translation (by EPO and Google)—published May 19, 1998; Sekisui Chemical Co Ltd.
JPS63274572A Machine Translation (by EPO and Google)—published Nov. 11, 1988; Canon KK.
Co-pending U.S. Appl. No. 18/016,343, inventors Levanon; Moshe et al., filed Jan. 15, 2023.
Co-pending U.S. Appl. No. 18/107,874, filed Feb. 9, 2023.
Co-pending U.S. Appl. No. 18/137,460, filed Apr. 21, 2023.
Co-pending U.S. Appl. No. 18/203,030, filed May 29, 2023.
DE102012011783A1 Machine Translation (by EPO, PlatPat and Google)—published Dec. 19, 2013; Heidelberger Druckmasch AG.
JP2003227549A Machine Translation (by EPO, PlatPat and Google)—published Aug. 15, 2003; Xerox Corp.
JP2007111891A Machine Translation (by EPO and Google)—published May 10, 2007; Mitsubishi Heavy Ind Ltd.
JP2009000916A Machine Translation (by EPO and Google)—published Jan. 8, 2009; Fujifilm Corp.
JP2010076214A Machine Translation (EPO, PlatPat and Google) published on Apr. 8, 2010 Fuji Xerox Co Ltd.
JP2012081770A Machine Translation (EPO, PlatPat and Google) published on Apr. 26, 2012 Komori Printing Mach.
JP3712547B2 Machine Translation (EPO, PlatPat and Google) published on Nov. 2, 2005 Sasaya Shunji.
JPH01142811A Machine Translation (by EPO and Google)—published Jun. 5, 1989; Fanuc Ltd.
JPH05249870A Machine Translation (by EPO, PlatPat and Google)—published Sep. 28, 1993; Matsushita Electric Ind Co Ltd.

(56) References Cited

OTHER PUBLICATIONS

JPH08272224A Machine Translation (by EPO, PlatPat and Google)—published Oct. 18, 1996; Ricoh KK.

* cited by examiner

PRINTING SYSTEM

CROSS-REFERENCE TO RELATED APPLICATIONS

The present application is a continuation of U.S. application Ser. No. 16/901,856 filed on Jun. 15, 2020 which is incorporated herein by reference in its entirety. U.S. application Ser. No. 16/901,856 is a continuation of U.S. application Ser. No. 16/433,970 filed on Jun. 6, 2019 which is incorporated herein by reference in its entirety. U.S. application Ser. No. 16/433,970 is a continuation of U.S. application Ser. No. 15/871,797 filed on Jan. 15, 2018 which is incorporated herein by reference in its entirety. U.S. application Ser. No. 15/871,797 is a continuation of U.S. application Ser. No. 15/439,966 filed on Feb. 23, 2017 and which is incorporated herein by reference in its entirety. U.S. application Ser. No. 15/439,966 is a continuation of U.S. application Ser. No. 15/053,017 filed on Feb. 25, 2016 and which is incorporated herein by reference in its entirety. U.S. application Ser. No. 15/439,966 is a continuation-in-part of U.S. application Ser. No. 14/382,758 which published as US 2015/0022602 on Jan. 22, 2015 and which is incorporated herein by reference in its entirety. U.S. application Ser. No. 14/382,758 is a national phase of PCT/IB13/51718 filed on Mar. 5, 2013 which published as WO/2013/132420 on Sep. 12, 2013 and is incorporated herein by reference in its entirety. PCT/IB13/51718 claims priority to the following patent applications, all of which are incorporated by reference in their entirety: U.S. Application No. 61/606,913 filed on Mar. 5, 2012; U.S. Application No. 61/611,286 filed on Mar. 15, 2012; U.S. Application No. 61/611,505 filed on Mar. 15, 2012; U.S. Application No. 61/619,546 filed on Apr. 3, 2012; U.S. Application No. 61/635,156 filed on Apr. 18, 2012 and U.S. Application No. 61/640,493 filed on Apr. 30, 2012.

FIELD OF THE DISCLOSURE

The present invention relates to a printing system.

BACKGROUND

WO2013/136220 incorporated herein by reference, discloses a printing process which comprises directing droplets of an ink onto an intermediate transfer member (ITM) to form an ink image at an image forming station, the ink including an organic polymeric resin and a coloring agent (e.g. a pigment or a dye) in an aqueous carrier. The intermediate transfer member, which can be a belt or a drum, has a hydrophobic outer surface whereby each ink droplet spreads on impinging upon the intermediate transfer member to form an ink film. Steps are taken to counteract the tendency of the ink film formed by each droplet to contract and to form a globule on the intermediate transfer member, without causing each ink droplet to spread by wetting the surface of the intermediate transfer member. The ink image is next heated while being transported by the intermediate transfer member, to evaporate the aqueous carrier from the ink image and leave behind a residue film of resin and coloring agent which is then transferred onto a substrate.

The present invention is concerned with the construction of an intermediate transfer member that may be employed in such a printing process but may also find application in other offset printing systems. The intermediate transfer member described in the afore-mentioned applications may be a continuous loop belt which comprises a flexible blanket having a release layer, with a hydrophobic outer surface, and a reinforcement layer. The intermediate transfer member may also comprise additional layers to provide conformability of the release layer to the surface of the substrate, e.g. a compressible layer and a conformational layer, to act as a thermal reservoir or a thermal partial barrier, to allow an electrostatic charge to the applied to the release layer, to connect between the different layers forming the overall cohesive/integral blanket structure, and/or to prevent migration of molecules there-between. An inner layer can further be provided to control the frictional drag on the blanket as it is rotated over its support structure.

At the image forming station, it is important to maintain a fixed distance between the surface of the ITM and the nozzle of the print heads that jet ink onto the surface of the ITM. Furthermore, as printing is performed by multiple print bars staggered in the direction of movement of the ITM, it is important to ensure that the ITM does not meander from side to side if correct alignment is to be maintained between ink droplets deposited by different print bars. The problem of accurate registration may prove more severe as the dimensions of the belt increase and/or when the belt is not mounted on solid supports over a significant portion of the path that it follows in operation.

SUMMARY

An intermediate transfer member (ITM) for use in a printing system to transport ink images from an image forming station to an impression station for transfer of the ink image from the ITM onto a printing substrate is disclosed herein. The ITM comprises a uniform-width, endless flexible belt which, during use, passes over drive and guide rollers and is guided through at least the image forming station by guide channels that receive formations provided on both lateral edges of the belt, wherein the formations on a first edge differ from the formations on the second edge by being configured for providing the elasticity desired to maintain the belt taut when the belt is guided through their respective lateral channels.

An intermediate transfer member (ITM) for use in a printing system to transport ink images from an image forming station to an impression station for transfer of the ink image from the ITM onto a printing substrate is disclosed herein. The ITM comprises a uniform-width, endless flexible belt which, during use, passes over drive and guide rollers and is guided through at least the image forming station by guide channels that receive formations provided on both lateral edges of the belt, wherein the attachment of the formations to a first of the lateral edges differs from the attachment of the formations to a second (i.e. on the opposite side of the belt) of the lateral edges, the attachment to only one of the two lateral edges being configured to provide sufficient elasticity to maintain the belt taut when the belt is guided through their respective lateral channels.

In addition to the ITM, a printing system is disclosed herein. The printing system comprises: a. an intermediate transfer member (ITM) comprising a uniform-width, endless flexible belt; b. an image forming station at which droplets of ink are applied to an outer surface of the ITM to form ink images thereon; and c. an impression station for transfer of the ink images from the ITM onto printing substrate, wherein: (i) the ITM is guided to transport ink images from the image forming station, (ii) the belt passes over drive and guide rollers and is guided through at least the image forming station by guide channels that receive formations provided on both lateral edges of the belt and (iii) the formations on a first edge differ from the formations on the second edge by being configured for providing the elasticity desired to maintain the belt taut when the belt is guided through their respective lateral channels.

In addition to the ITM, a printing system is disclosed herein. The printing system comprises: a. an intermediate transfer member (ITM) comprising a uniform-width, endless flexible belt; b. an image forming station at which droplets of ink are applied to an outer surface of the ITM to form ink images thereon; and c. an impression station for transfer of the ink images from the ITM onto printing substrate, wherein: (i) the ITM is guided to transport ink images from the image forming station, (ii) the belt passes over drive and guide rollers and is guided through at least the image forming station by guide channels that receive formations provided on both lateral edges of the belt and (iii) the attachment of the formations to a first of the lateral edges differs from the attachment of the formations to a second (i.e. on the opposite side of the belt) of the lateral edges, the attachment to only one of the two edges being configured to provide sufficient elasticity to maintain the belt taut when the belt is guided through their respective lateral channels.

In some embodiments, the formations on a first edge are secured to the belt in such manner as to remain at a fixed distance from a notional centerline of the belt and the formations on the second edge are connected to the belt by way of an elastically extensible member to allow the distance of the formations on the second edge from the notional centerline of the belt to vary and to maintain the belt under lateral tension as the belt passes through the image forming station.

In some embodiments, a web of substantially inextensible fabric is used for attaching the formations (e.g. teeth) to the first edge of the belt and a web of elastically extensible fabric is used for attaching the formations (e.g. the teeth) to the second edge of the belt.

In some embodiments, the inextensible fabric and extensible fabric are bonded to the respective edges of the belt.

In some embodiments, the surface of the belt arranged to transport the ink images is hydrophobic.

In some embodiments, the hydrophobic surface of the belt is supported on a fiber reinforced or fabric layer that is substantially inextensible along both the length and the width of the belt.

It is also disclosed a printing system that comprises (a) an image forming station at which droplets of an ink that includes an organic polymer resin and a coloring agent in an aqueous carrier are applied to an outer surface of an intermediate transfer member (ITM) to form an ink image, (b) a drying station for drying the ink image to leave an ink residue film; and (c) an impression station at which the residue film is transferred to a sheet or web substrate. The system provides the following features: (i) the ITM comprises a thin flexible substantially inextensible belt (ii) the impression station comprises an impression cylinder and a pressure cylinder having a compressible outer surface or carrying a compressible blanket of at least the same length as a substrate for urging the belt against the impression cylinder to cause the residue film resting on the outer surface of the belt to be transferred onto the substrate that passes between the belt and the impression cylinder; and (iii) the belt has a length greater than the circumference of the pressure cylinder and is being guided to contact the pressure cylinder over only a portion of the length of the belt.

In some embodiments, the printing system further comprises a guiding assembly comprising drive and guide rollers configured for guiding the belt through at least the image forming station by guide channels that receive formations provided on both lateral edges of the belt, wherein the formations on a first edge differ from the formations on the second edge by being configured for providing the elasticity desired to maintain the belt taut when the belt is guided through their respective lateral channels.

In some embodiments, the formations on a first edge are secured to the belt in such manner as to remain at a fixed distance from a notional centerline of the belt and the formations on the second edge are connected to the belt by way of an elastically extensible member to allow the distance of the formations on the second edge from the notional centerline of the belt to vary and to maintain the belt under lateral tension as the belt passes through the image forming station.

In some embodiments, a web of substantially inextensible fabric is used for attaching the formations (e.g. the teeth) to the first edge of the belt and a web of elastically extensible fabric is used for attaching the formations (e.g. the teeth) to the second edge of the belt.

In some embodiments, the inextensible fabric and extensible fabric are bonded to the respective edges of the belt.

In some embodiments, the surface of the belt arranged to transport the ink images is hydrophobic.

In some embodiments, the hydrophobic surface of the belt is supported on a fiber reinforced or fabric layer that is substantially inextensible along both the length and the width of the belt.

In some embodiments, (i) the belt comprises a support and a release layer and (ii) the support layer is made of a fabric that is fiber-reinforced at least in the longitudinal direction of the belt, said fiber being a high performance fiber selected from the group comprising aramid, carbon, ceramic, and glass fibers.

It is also disclosed a printing system that comprises an image forming station at which droplets of an ink that includes an organic polymer resin and a coloring agent in an aqueous carrier are applied to an outer surface of an intermediate transfer member to form an ink image, a drying station for drying the ink image to leave an ink residue film; and an impression station at which the residue film is transferred to a sheet or web substrate wherein the intermediate transfer member comprises a thin flexible substantially inextensible belt and wherein the impression station comprises an impression cylinder and a pressure cylinder having a compressible outer surface or carrying a compressible blanket of at least the same length as a substrate sheet for urging the belt against the impression cylinder to cause the residue film resting on the outer surface of the belt to be transferred onto the substrate that passes between the belt and the impression cylinder, the belt having a length greater than the circumference of the pressure cylinder and being guided to contact the pressure cylinder over only a portion of the length of the belt; wherein the belt comprises a support layer and a release layer and is substantially inextensible in the longitudinal direction of the belt but has limited lateral elasticity to assist in maintaining the belt taut and flat in the image forming station.

In some embodiments, the support layer is made of a fabric that is fiber-reinforced at least in the longitudinal direction of the belt, said fiber being a high performance fiber selected from the group comprising aramid, carbon, ceramic, and glass fibers.

In some embodiments, longitudinally spaced formations, or a thick continuous flexible bead, are/is provided along each of the two lateral edges of the belt, the beads or formations being engaged in lateral guide channels extending at least over the run of the belt passing through the image forming station.

In some embodiments, guide channels are further provided to guide the run of the belt passing through the impression station.

In some embodiments, the formations or beads on the lateral edges of the belt are retained within the channels by rolling bearings.

In some embodiments, the formations are formed by the teeth of one half of a zip fastener sewn, or otherwise secured, to each lateral edge of the belt. An elastic strip may in such embodiments be located between the teeth of one zip fastener half and the associated lateral edge of the belt."

In some embodiments, the belt is formed by a flat elongate strip of which the ends are secured to one another at a seam to form a continuous loop.

According to another aspect of the present invention, there is provided a printing system comprising an image forming station at which droplets of an ink that include an organic polymeric resin and a coloring agent in an aqueous carrier are applied to an outer surface of an intermediate transfer member to form an ink image, a drying station for drying the ink image to leave a residue film of resin and coloring agent; and an impression station at which the residue film is transferred to a substrate, wherein the intermediate transfer member comprises a thin flexible substantially inextensible belt and wherein the impression station comprises an impression cylinder and a pressure cylinder having a compressible outer surface for urging the belt against the impression cylinder, during engagement with the pressure cylinder, to cause the residue film resting on the outer surface of the belt to be transferred onto a substrate passing between the belt and the impression cylinder, the belt having a length greater than the circumference of the pressure cylinder and being guided to contact the pressure cylinder over only a portion of the length of the belt.

In some embodiments of the invention, the belt is driven independently of the pressure cylinder.

In the present invention, the belt passing through the image forming station is a thin, light belt of which the speed and tension can be readily regulated. Slack runs of the belt may be provided between the impression station and the image forming station to ensure that any vibration imposed on the movement of the belt while passing through the impression station should be effectively isolated from the run of the belt in the image forming station.

At the impression station, the compressible blanket on the pressure cylinder can ensure intimate contact between the belt and the surface of the substrate for an effective transfer of the ink residue film onto the substrate.

In some embodiments of the invention, the belt comprises a reinforcement or support layer coated with a release layer. The reinforcement layer may be of a fabric that is fiber-reinforced so as to be substantially inextensible lengthwise. By "substantially inextensible", it is meant that during any cycle of the belt, the distance between any two fixed points on the belt will not vary to an extent that will affect the image quality. The length of the belt may however vary with temperature or, over longer periods of time, with ageing or fatigue. In one embodiment, the elongation of the belt in its longitudinal direction (e.g. parallel to the direction of movement of the belt from the image forming station to the impression station) is of at most 1% as compared to the initial length of the belt, or of at most 0.5%, or of at most 0.1%. In its width ways direction, the belt may have a small degree of elasticity to assist it in remaining taut and flat as it is pulled through the image forming station. The elasticity of the belt is hence substantially greater in the lateral direction as compared to the longitudinal direction. A suitable fabric may, for example, have high performance fibers (e.g. aramid, carbon, ceramic or glass fibers) in its longitudinal direction woven, stitched or otherwise held with cotton fibers in the perpendicular direction, or directly embedded or impregnated in the rubber forming the belt. A reinforcement layer, and consequently a belt, having different physical and optionally chemical properties in its length and width directions is said to be anisotropic. Alternatively, the difference in "elasticity" between the two perpendicular directions of the belt strip can be achieved by securing to a lateral edge of the belt an elastic strip providing the desired degree of elasticity even when using an isotropic support layer being substantially inextensible also in its width direction.

To assist in guiding the belt and prevent it from meandering, it is desirable to provide a continuous flexible bead of greater thickness than the belt, or longitudinally spaced formations, along the two lateral edges of the belt that can engage in lateral guide channels or tracks extending at least over the run of the belt passing through the image forming station and preferably also the run passing through the impression station. The distance between the channels may advantageously be slightly greater that the overall width of the belt, to maintain the belt under lateral tension.

To reduce the drag on the belt, the formations or bead on the lateral edges of the belt, in an embodiment of the invention, are retained within the channels by rolling bearings.

Lateral formations may conveniently be the teeth of one half of a zip fastener sewn, or otherwise secured, to each lateral edge of the belt. Such lateral formations need not be regularly spaced.

The belt is advantageously formed by a flat elongate strip of which the ends can be secured to one another to form a continuous loop. A zip fastener may be used to secure the opposite ends of the strip to one another so as to allow easy installation and replacement of the belt. The ends of the strip are advantageously shaped to facilitate guiding of the belt through the lateral channels and over the rollers during installation. Initial guiding of the belt into position may be done for instance by securing the leading edge of the belt strip introduced first in between the lateral channels to a cable which can be manually or automatically moved to install the belt. For example, one or both lateral ends of the belt leading edge can be releasably attached to a cable residing within each channel. Advancing the cable(s) advances the belt along the channel path. Alternatively or additionally, the edge of the belt in the area ultimately forming the seam when both edges are secured one to the other can have lower flexibility than in the areas other than the seam. This local "rigidity" may ease the insertion of the lateral formations of the belt strip into their respective channels.

Alternatively, the belt may be adhered edge to edge to form a continuous loop by soldering, gluing, taping (e.g. using Kapton® tape, RTV liquid adhesives or PTFE thermoplastic adhesives with a connective strip overlapping both edges of the strip), or any other method commonly known. Any previously mentioned method of joining the ends of the belt may cause a discontinuity, referred to herein as a seam, and it is desirable to avoid an increase in the thickness or discontinuity of chemical and/or mechanical properties of the belt at the seam. Preferably, no ink image or part thereof is deposited on the seam, but only as close as feasible to such discontinuity on an area of the belt having substantially uniform properties/characteristics.

In a further alternative, it is possible for the belt to be seamless.

The compressible blanket on the pressure cylinder in the impression station need not be replaced at the same time as the belt, but only when it has itself become worn.

As in a conventional offset litho press, the pressure cylinder and the impression cylinder are not fully rotationally symmetrical. In the case of the pressure cylinder, there is a discontinuity where the ends of the blanket are secured to the cylinder on which it is supported. In the case of the impression cylinder, there can also be a discontinuity to accommodate grippers serving to hold the sheets of substrate in position against the impression cylinder. The pressure cylinder and the impression cylinder rotate in synchronism so that the two discontinuities line up during cycles of the pressure cylinder. If the impression cylinder circumference is twice that of the pressure cylinder and has two sets of grippers, then the discontinuities line up twice every cycle for the impression cylinder to leave an enlarged gap between the two cylinders. This gap can be used to ensure that the seam connecting the ends of the strip forming the belt can pass between the two cylinders of the impression station without itself being damaged or without causing damage to the blanket on the pressure cylinder, to the impression cylinder or to a substrate passing between the two cylinders.

If the length of the belt is a whole number multiple of the circumference of the pressure cylinder, then the rotation of the belt can be timed to remain in phase with the pressure cylinder, so that the seam should always line up with the enlarged gap created by the discontinuities in the cylinders of the impression station.

If the belt should extend (or contract) then rotation of the belt and the cylinders of the impression station at the same speed will eventually result in the seam not coinciding with the enlarged gap between the pressure and impression cylinders. This problem may be avoided by varying the speed of movement of the belt relative to the surface velocity of the pressure and impression cylinders and providing powered tensioning rollers, or dancers, on opposite sides of the nip between the pressure and impression cylinders. The speed differential will result in slack building up on one side or the other of the nip between the pressure and impression cylinders and the dancers can act at times when there is an enlarged gap between the pressure and impression cylinders to advance or retard the phase of the belt, by reducing the slack on one side of the nip and increasing it on the other.

In this way, the belt can be maintained in synchronism with the pressure and impression cylinders so that the belt seam always passes through the enlarged gap between the two cylinders. Additionally, it allows ink images on the belt to always line up correctly with the desired printing position on the substrate.

In order to minimize friction between the belt and the pressure cylinder during such changing of the phase of the belt, it is desirable for rollers to be provided on the pressure cylinder in the discontinuity between the ends of the blanket.

In an alternative embodiment, the impression cylinder has no grippers (e.g. for web substrate or for sheet substrate retained on the impression cylinder by vacuum means), in which case the impression cylinder may have a continuous surface devoid of recess, restricting the need to align the seam to the discontinuity between the ends of the compressible blanket on the pressure cylinder. If additionally, the belt is seamless, the control of the synchronization between ink deposition on the belt and operation of the printing system at subsequent stations, such as illustrated in a non-limiting manner in the following detailed description, may be further facilitated.

The printing system in U.S. 61/606,913 allows duplex operation by providing two impression stations associated with the same intermediate transfer member with a perfecting mechanism between the two impression stations for turning the substrate onto its reverse side. This was made possible by allowing a section of the intermediate transfer member carrying an ink image to pass through an impression station without imprinting the ink image on a substrate. While this is possible when moving a relatively small pressure roller, or nip roller, into and out of engagement with an impression cylinder, moving the pressure cylinder of the present invention in this manner would be less convenient.

In order to permit double-sided printing using a single impression station having blanket-bearing pressure and impression cylinders that are favorably engaged permanently, a duplex mechanism is provided in an embodiment of the invention for inverting a substrate sheet that has already passed through the impression station and returning the sheet of substrate to pass a second time through the same impression station for an image to be printed onto the reverse side of the substrate sheet.

In accordance with a second aspect of the invention, there is provided a printing system comprising an image forming station at which droplets of an ink that include an organic polymeric resin and a coloring agent in an aqueous carrier are applied to an outer surface of an intermediate transfer member to form an ink image, a drying station for drying the ink image to leave a residue film of resin and coloring agent; and an impression station at which the residue film is transferred to a substrate, wherein the intermediate transfer member comprises a thin flexible substantially inextensible belt and wherein the impression station comprises an impression cylinder and a pressure cylinder having a compressible outer surface for urging the belt against the impression cylinder to cause the residue film resting on the outer surface of the belt to be transferred onto a substrate passing between the belt and the impression cylinder, the belt having a length greater than the circumference of the pressure cylinder and being guided to contact the pressure cylinder over only a portion of the length of the belt.

There is disclosed here a printing process which comprises directing droplets of an ink onto an image transfer member to form an ink image, the ink including a resin binder and a pigment in an aqueous carrier, and the transfer member having a hydrophobic outer surface whereby each ink droplet spreads on impinging upon the image transfer member to form an ink film; treating the outer surface of the image transfer member to counteract the tendency of the ink film formed by each droplet to contract and to form a globule on the image transfer member, without causing each droplet ink film to spread by wetting the surface of the image transfer member; heating the ink image, while being transported by the image transfer member, to evaporate the aqueous carrier from the ink image to leave a residue film of resin and pigment; and transferring the residue film to a substrate.

In an embodiment, the treating includes applying a layer of charge to the image transfer member to fix, at least partially, the shape of each ink droplet film immediately after impingement on the image transfer member. Such a layer of charge may be applied by coating the surface of the image transfer member with a chemical agent.

The effect of the chemical agent is enhanced if it has a high charge density, such as polyethylenimine. The chemical agent may be applied as a dilute solution in a solvent the solution may be heated to evaporate the solvent prior to the ink image formation, whereby the ink droplets are directed onto a substantially dry surface.

A feature of an embodiment of the invention is that the solvent is predominantly aqueous.

Instead of, or in addition to, the application of a chemical agent, a layer of charge may be applied electrically to the surface of the image transfer member.

The treating may additionally or alternatively include heating the image transfer surface prior to formation of an ink image, so as to raise the temperature of the image transfer surface thereby heating each ink droplet on impact.

In an embodiment of the invention, the image transfer member is a blanket of which the outer surface is the hydrophobic outer surface upon which the ink image is formed. It is however alternatively possible for the image transfer member to be constructed as a drum.

In accordance with a feature of some embodiments of the invention, prior to transferring the residue film onto the substrate, the ink image is heated to a temperature at which the residue film of resin and pigment that remains after evaporation of the aqueous carrier is rendered tacky. The temperature of the tacky residue film on the image transfer member may be higher than the temperature of the substrate, whereby the residue film cools during adhesion to the substrate.

By suitable selection of the thermo-rheological characteristics of the residue film the effect of the cooling may be to increase the cohesion of the residue film, whereby its cohesion exceeds its adhesion to the transfer member so that substantially all of the residue film is separated from the image transfer member and impressed as a film onto the substrate. In this way, it is possible to ensure that the residue film is impressed on the substrate without significant modification to the area covered by the film nor its thickness.

Further disclosed herein are printing systems for implementing the method aspects of the invention.

Still further disclosed herein is a substrate printed using an aqueous based ink, wherein the printed image is formed by a plurality of ink dots and each ink dot is constituted by a film of substantially uniform thickness, the printed image overlying the outer surface of the substrate without penetrating beyond the surface roughness of the substrate. The average film thickness may not exceed 500 nanometers.

In an embodiment of the invention, n each ink dot in the image, that does not merge into an adjacent ink dot, has a regular rounded outline.

This application provides an overview of an indirect printing process.

In general, an indirect printing process comprises applying an imagewise distribution of ink onto a transfer member and transferring the imagewise distribution of ink from the transfer member to a final substrate.

A feature of some embodiments of the invention is concerned with the composition of the ink. In some embodiments, the ink utilizes an aqueous carrier, which reduces pollution issues that occur with inks that utilize volatile hydrocarbon carrier. In general, the ink must have the physical properties that are needed to apply very small droplets close together on the transfer member. Other necessary characteristics of the ink will become clear in the discussion below of the process.

A feature of some embodiments of the invention is concerned with the transfer member. This member can be either a web or belt formed from a blanket or a drum covered with a blanket or coated with suitable layer of material.

As is well known, silicone is strongly hydrophobic. The water based ink droplets impinge at high speed onto the transfer member. When they hit the member, the droplets spread due to their momentum to form a pancake shaped droplet film. In a very short time (probably of the order of milliseconds) the combination of the hydrophobic nature of the transfer member and the surface tension of the droplet force the droplets to bead up on the surface.

While it has been suggested in the prior art that a coagulant be applied to the droplets, this does not change the nature of the droplets, whose shape is substantially unchanged and essentially spherical.

For aqueous inks that are made up of pigmented particles, the particles are generally formed of a negatively charged polymer (e.g., a resin binder) with pigments dispersed therein. Some inks useful in the invention have a polymer that is dissolved in the aqueous carrier and the pigments dispersed in the carrier.

According to an aspect of some embodiments of the invention, the release layer of the transfer member has a positive charge. In some embodiments of the invention, this charge is affected by coating the transfer member with a positively charged polymer or other material, for example by spraying an aqueous solution of the material onto the transfer member before it receives the image. It is believed that such pre-treatment chemical agents, for instance some charged polymers, will bond (temporarily at least), with the silicone surface of the transfer member to form a positively charged layer. However, the amount of charge that is present in such layer is believed to be much smaller than that in the droplet itself. The present inventors have found that a very thin layer, perhaps even a layer of molecular thickness will be adequate.

This layer of pre-treatment of the transfer member may be applied in very dilute form of the suitable chemical agents. Ultimately this thin layer may be transferred onto the substrate, along with the image being impressed.

when the droplet impinges on the transfer member, the momentum in the droplet causes it to spread into a relatively flat film. In the prior art, this flattening of the droplet is almost immediately counteracted by the combination of surface tension of the droplet and the hydrophobic nature of the surface of the transfer member.

According to an aspect of some embodiments of the invention, the shape of the ink droplet is "frozen" such that at least some or, in some embodiments, a major part of the flattening and horizontal extension of the droplet present on impact is preserved. It should be understood that since the recovery of the droplet shape after impact is very fast, the methods of the prior art would not effect phase change by agglomeration and/or coagulation and/or migration.

According to this aspect, on impact, the positive charges on the transfer member attract the negatively charged binder polymer particles of the ink that are immediately adjacent to the surface of the member. As the droplet spreads, this effect takes place along the entire interface between the spread droplet and the transfer member.

The amount of charge on the transfer member is too small to attract more than a small number of particles, so that, it is believed, the concentration and distribution of particles in the drop is not substantially changed. Furthermore, since the ink is aqueous, the effects of the positive charge are very local, especially in the very short time span needed for freezing the 15 shape of the droplets.

However, it has been surprisingly found that this attraction has a profound effect on the shape of the droplets after they stabilize. It is believed that the attractive force acts to counteract the repelling of the water in the ink by the silicone. The result is that a relatively flat droplet of ink of greater extent than would be present in the absence of the charge on the silicone surface is formed on the transfer member. Furthermore, since in areas that are not reached by the droplet the effective hydrophobic nature of the transfer member is maintained, there is little or no spreading of the droplet above that achieved in the initial impact and the boundaries of the droplet are distinct.

While applicants have found that spraying the transfer member with a charged polymer is an effective method for freezing the droplets, it is believed that spraying or otherwise transferring positive charge to the transfer member by physical methods is also possible, although this is a much more complex process. Other effects that may contribute to the shape of the droplet remaining in the flattened configuration are, quick heating of the droplet that increases its viscosity, a barrier (the polymer coating) that reduces the hydrophobic effect of the silicone layer and a surfactant that reduces the surface tension of the ink.

In general, ink jet printers require a trade-off between purity of the color, the ability to produce complete coverage of a surface and the density of the ink-jet nozzles. If the droplets (after beading) are small, then, in order to achieve complete coverage, it is necessary to have the droplets close together. However, it is very problematic (and expensive) to have the droplets closer than the distance between pixels. By forming relatively droplet films that are held in place in the manner described above, the coverage caused by the droplets can be close to complete.

In an aspect of some embodiments of the invention, the carrier liquid in the image is evaporated from the image after it is formed on the transfer member. Since the pigment in the droplets is dispersed within the droplet, one method for removal of the liquid is by heating the image, either by heating the transfer member or by external heating of the image after it is formed on the transfer member, or by a combination of both.

In some embodiments, the polymer used as the binder for the pigments of the ink is a polymer that forms a residue film when it is heated (the term residue film is used herein to refer to the ink droplets after they have been dried). Acrylic-styrene cop-polymers with an average molecular weight around 60,000 have been found to be suitable.

In some embodiments, all of the liquid is evaporated, however, a small amount of liquid, that does not interfere with the forming of a film may be present.

The formation of a residue film may provide a number of useful features. The first of these is that when the image is transferred to the final substrate all, or nearly all, of the image can be transferred. In some embodiments, it may be possible to provide a printing system without a cleaning station for removing residues from the transfer member. In some embodiments, the ink image be attached to the substrate with a constant thickness of the image covering the substrate.

In general, when an image is transferred to or formed on a substrate, while it is still liquid, the image penetrates into the fibers of the substrate and beneath its surface. This causes uneven color and a reduction in the depth of the color, since some of the pigment is blocked by the fibers.

In accordance with some embodiments, the residue film is very thin, for example between 10 nm and 800 nm or between 50 nm and 500 nm. Such thin films are transferred intact to the substrate and, because they are so thin, replicate the surface of the substrate by closely following its contours. This results in a much smaller difference in the gloss of the substrate between printed and non-printed areas.

When the residue film reaches a transfer station at which it is transferred to the final substrate, it is pressed against the substrate, having previously been heated to a temperature at which it becomes tacky in order to attach itself to the substrate.

In some embodiments, the substrate, which is generally not heated, cools the image so that it solidifies and transfers to the substrate without leaving any of residue film on the surface of the image transfer member. For this cooling to be effective, additional constraints are placed on the polymer in the ink.

The fact that the carrier is termed an aqueous carrier is not intended to preclude the presence of certain organic materials in the ink, in particular, certain innocuous water miscible organic material and/or co-solvents, however, substantially all of the volatile material in the ink is preferably water.

As the outer surface of image transfer member is hydrophobic, and therefore not water absorbent, there may be substantially no swelling of the belt, which was found to distort the surface of transfer members in commercially available products utilizing silicone coated transfer members and hydrocarbon carrier liquids. Consequently, the process described above may achieve a highly smooth release surface, as compared to image transfer member surfaces of the prior art.

As the image transfer surface is hydrophobic, and therefore not water absorbent, substantially all the water in the ink should be evaporated away if wetting of the substrate is to be avoided, though residual water presence in the film is not precluded.

At least 99%, and in some embodiments 100%, of the image formed on the transfer member should be transferred from the image transfer surface to the substrate. If a minimal amount of ink residue of the image should remain on the image transfer surface, then it may be cleaned during each printing cycle prior to a new image being printed on it. Alternatively, it may suffice to clean the transfer member only during maintenance between print runs to remove any build-up of ink residue.

In one embodiment, the ink residue or dried image is rendered tacky before it reaches the impression cylinder and the ink residue cools at the transfer station, by its contact with the substrate. The already tacky ink residue adheres immediately to the substrate onto which it is impressed under pressure and its cooling is sufficient to reduce its adhesion to the image transfer surface to the point that it will peel away neatly from the image transfer surface without compromising adhesion to the substrate.

As the substrate is not made wet in the process, no distortion of the substrate occurs and printing on the reverse side of the substrate presents no difficulty. The very thin ink film also ensures that the texture of the image matches that of the substrate.

It is now disclosed a printing process comprising:

directing droplets of an ink onto an image transfer member to form an ink image, the ink including a resin binder and a pigment in an aqueous carrier, and the transfer member having a hydrophobic outer surface whereby each ink droplet spreads on impinging upon the image transfer member to form an ink film;

treating the outer surface of the image transfer member to counteract the tendency of the ink film formed by each droplet to contract and to form a globule on the image transfer member, without causing each droplet ink film to spread by wetting the surface of the image transfer member;

heating the ink image, while being transported by the image transfer member, to evaporate the aqueous carrier from the ink image to leave a residue film of resin and pigment; and transferring the residue film to a substrate.

In some embodiments, the treating includes applying a layer of charge to the image transfer member to fix, at least partially, the shape of each ink droplet film immediately after impingement on the image transfer member.

In some embodiments, the treating comprises coating the surface of the image transfer member with a chemical agent.

In some embodiments, the chemical agent has a high charge density.

In some embodiments, the chemical agent is a polyethylenimine.

In some embodiments, the chemical agent is applied as a dilute solution in a solvent and wherein the solution is heated to evaporate the solvent prior to the ink image formation, whereby the ink droplets are directed onto a substantially dry surface.

In some embodiments, the solvent is predominantly aqueous.

In some embodiments, the layer of charge is applied electrically to the surface of the image transfer member.

In some embodiments, the treating includes heating the image transfer surface prior to formation of an ink image, so as to raise the temperature of the image transfer surface thereby heating each ink droplet on impact.

In some embodiments, the image transfer member is a blanket of which the outer surface is the hydrophobic outer surface upon which the ink image is formed.

In some embodiments, prior to transferring the residue film onto the substrate, the ink image is heated to a temperature at which the residue film of resin and pigment that remains after evaporation of the aqueous carrier is rendered tacky.

In some embodiments, the temperature of the tacky residue film on the image transfer member is higher than the temperature of the substrate, whereby the residue film cools during adhesion to the substrate.

In some embodiments, the thermo-rheological characteristics of the residue film are selected such that the cooling increases the cohesion of the residue film, whereby its cohesion exceeds its adhesion to the transfer member so that substantially all of the residue film is separated from the image transfer member and impressed as a film onto the substrate.

In some embodiments, the residue film is impressed on the substrate without significant modification to the area covered by the film nor its thickness.

It is now disclosed a printing system comprising:

an image transfer member having a hydrophobic outer release layer, a printing station including a supply of an ink that includes a resin binder and a pigment in an aqueous carrier and at least one mechanism for directing droplets of the ink onto the image transfer member to form an ink image, each ink droplet impacting the image transfer member at speed so as to spread and form a droplet film;

a treatment station at which the surface properties of the image transfer member are modified prior to formation of the ink image in order to counteract the tendency of the film formed by each ink droplet to contract and to form a globule on the image transfer member, without causing each droplet film to spread by wetting the surface of the image transfer member;

heating apparatus to heat the ink image while being transported by the image transfer member, so as to evaporate the aqueous carrier from the ink image to leave on the surface of the image transfer member a residue film of resin and pigment, and an impression station at which residue film is transferred from the image transfer member onto the substrate.

In some embodiments, the treatment station serves to apply a layer of charge to the image transfer member to at least partially fix the shape of each ink droplet immediately after it impinges on the image transfer member.

In some embodiments, the treatment station is operative to coat the surface of the image transfer with a chemical agent.

In some embodiments, the chemical agent has a high charge density to fix the film to the transfer member by the action of mutually attracting electrical charges.

In some embodiments, the chemical agent is a polyethylenimine.

In some embodiments, the chemical agent is applied as a dilute solution in a solvent and wherein the solution is heated to evaporate the solvent prior to the inkjet printing step, whereby the ink droplets are jetted onto a substantially dry surface.

In some embodiments, the solvent is predominantly aqueous.

In some embodiments, the treating station a source of electrons or ions and is operative to apply an electrostatic charge to the surface of the image transfer member.

In some embodiments, the treating station includes a heater to heat the image transfer surface prior to its reaching said printing station, so as to raise the temperature of the image transfer surface thereby heating each ink droplet on impact.

In some embodiments, prior to said transfer station, a heater is provided to heat the ink image to a temperature at which the residue film of resin and pigment that remains after evaporation of the aqueous carrier is rendered tacky.

In some embodiments, the heating apparatus includes a plurality of heated plates in thermal contact with an inner surface of the blanket.

In some embodiments, the heating apparatus includes a blower for directing a stream of hot gas onto the outer surface of the transfer member.

In some embodiments, the heating apparatus includes a source of electromagnetic radiation, the radiation from which is directed onto to the surface of the transfer member.

It is now disclosed a substrate printed using an aqueous based ink, wherein the printed image is formed by a plurality of ink dots and each ink dot is constituted by a film of substantially uniform thickness, the printed image overlying the outer surface of the substrate without penetrating beyond the surface roughness of the substrate.

In some embodiments, the average film thickness does not exceed 500 nanometers.

In some embodiments, each ink dot in the image, that does not merge into an adjacent ink dot, has a regular rounded outline.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings.

Figure 1:
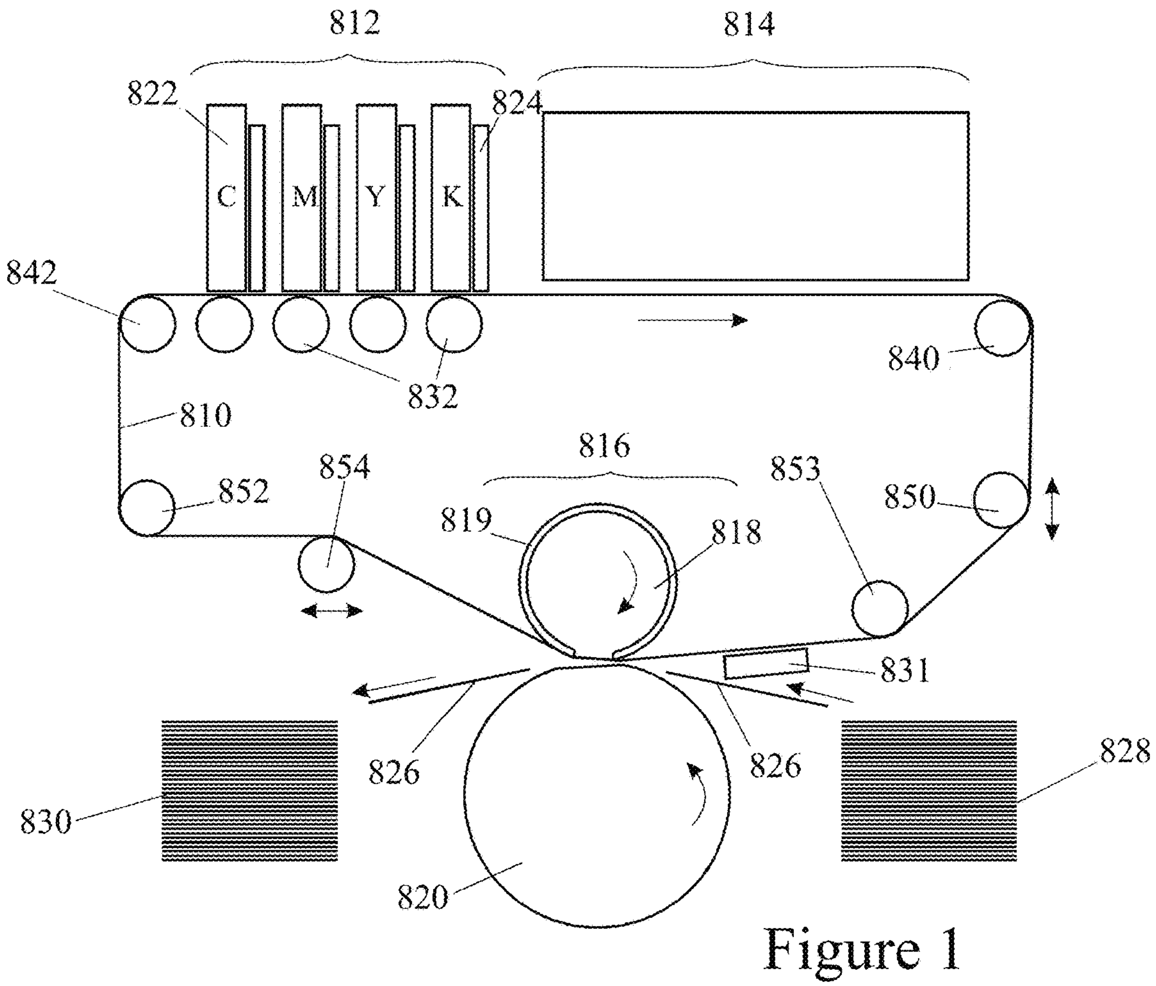
FIG. 1 is a schematic representation of a printing system of the invention.

Throughout the present specification, any reference to the terms "upstream" or "downstream" is used as a matter of mere convenience, and is determined by standing at the front of the printing machine the direction of travel of the ITM from the image forming station to the impression station, termed the "printing direction", being clockwise. Likewise, "upward" and "downward" orientations, as well as "above" and "below" or "upper" and "lower" or any such terms, are relative to the ground or operating surface. When referring to the figures, like parts have been allocated the same reference numerals.

DETAILED DESCRIPTION

The printing system of FIG. 1 comprises an endless belt 810 that cycles through an image forming station 812, a drying station 814, and an impression station 816.

In the image forming station 812 four separate print bars 822 incorporating one or more print heads, that use inkjet technology, deposit aqueous ink droplets of different colors onto the surface of the belt 810. Though the illustrated embodiment has four print bars each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of grey including black) or for two print bars or more to deposit the same color (e.g. black). Following each print bar 822 in the image forming station, an intermediate drying system 824 is provided to blow hot gas (usually air) onto the surface of the belt 810 to dry the ink droplets partially. This hot gas flow assists in preventing the droplets of different color inks on the belt 810 from merging into one another.

In the drying station 814, the ink droplets on the belt 810 are exposed to radiation and/or hot gas in order to dry the ink more thoroughly, driving off most, if not all, of the liquid carrier and leaving behind only a layer of resin and coloring agent which is heated to the point of being softened. Softening of the polymeric resin may render the ink image tacky and increases its ability to adhere to the substrate as compared to its previous ability to adhere to the transfer member.

In the impression station 816, the belt 810 passes between an impression cylinder 820 and a pressure cylinder 818 that carries a compressible blanket 819. The length of the blanket 819 is equal to or greater than the maximum length of a sheet 826 of substrate on which printing is to take place. The length of the belt 810 is longer than the circumference of the pressure cylinder 818 by at least 10%, and in one embodiment considerably longer by at least 3-fold, or at least 5-fold, or at least 7-fold, or at least 10-fold, and only contacts the pressure cylinder 818 over a portion of its length. The impression cylinder 820 has twice the diameter of the pressure cylinder 818 and can support two sheets 826 of substrate at the same time. Sheets 826 of substrate are carried by a suitable transport mechanism (not shown in FIG. 1) from a supply stack 828 and passed through the nip between the impression cylinder 820 and the pressure cylinder 818. Within the nip, the surface of the belt 810 carrying the ink image, which may at this time be tacky, is pressed firmly by the blanket 819 on the pressure cylinder 818 against the substrate 826 so that the ink image is impressed onto the substrate and separated neatly from the surface of the belt. The substrate is then transported to an output stack 830. In some embodiments, a heater 831 may be provided to heat the thin surface of the release layer, shortly prior to the nip between the two cylinders 818 and 820 of the impression station, to soften the resin and to assist in rendering the ink film tacky, so as to facilitate transfer to the substrate.

In order for the ink to separate neatly from the surface of the belt 810 it is necessary for the latter surface to have a hydrophobic release layer. In WO 2013/132418, which claims priority from U.S. Provisional Patent Application No. 61/606,913, (both of which application are herein incorporated by reference in their entirety) this hydrophobic release layer is formed as part of a thick blanket that also includes a compressible and a conformability layer which are necessary to ensure proper contact between the release layer and the substrate at the impression station. The resulting blanket is a very heavy and costly item that needs to be replaced in the event a failure of any of the many functions that it fulfills.

In the present invention, the hydrophobic release layer forms part of a separate element from the thick blanket 819 that is needed to press it against the substrate sheets 826. In FIG. 1, the release layer is formed on the flexible thin inextensible belt 810 that is preferably fiber reinforced for increased tensile strength in its lengthwise dimension, high performance fibers being particularly suitable.

Figure 4:
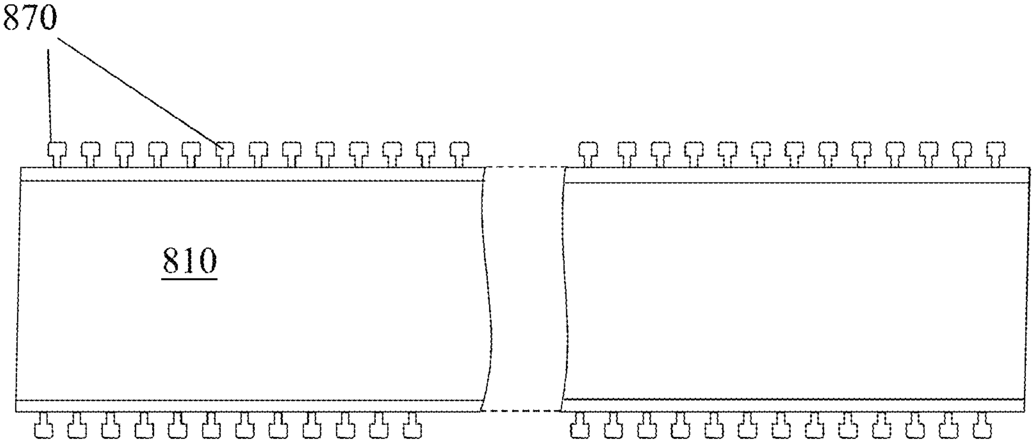
FIG. 4 is a plan view of a strip from which a belt is formed, the strip having formations along its edges to assist in guiding the belt.
Figure 5:
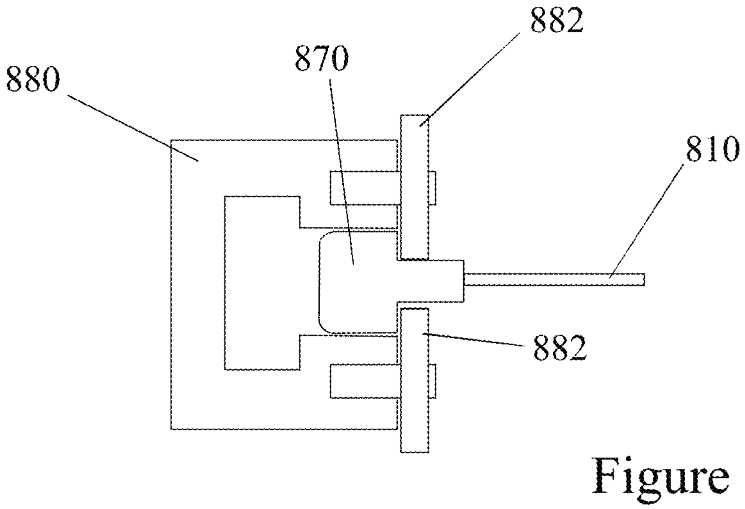
FIG. 5 is a section through a guide channel for the belt within which the formations shown in FIG. 4 are received.

As shown schematically in FIGS. 4 and 5, the lateral edges of the belt 810 are provided in some embodiments of the invention with spaced projections or formations 870 which on each side are received in a respective guide channel 880 (shown in section in FIG. 5) in order to maintain the belt taut in its widthways dimension. The formations 870 may be the teeth of one half of a zip fastener that is sewn or otherwise secured to the lateral edge of the belt. As an alternative to spaced formations, a continuous flexible bead of greater thickness than the belt 810 may be provided along each side. To reduce friction, the guide channel 880 may, as shown in FIG. 5, have rolling bearing elements 882 to retain the formations 870 or the beads within the channel 880. The formations need not be the same on both lateral edges of the belt. They can differ in shape, spacing, composition and physical properties. For example, the formation on one side may provide the elasticity desired to maintain the belt taut when the lateral formations are guided through their respective lateral channels. Though not shown in the figure, on one side of the belt the lateral formations may be secured to an elastic stripe, itself attached to the belt.

The formations may be made of any material able to sustain the operating conditions of the printing system, including the rapid motion of the belt. Suitable materials can resist elevated temperatures in the range of about 50° C. to 250° C. Advantageously, such materials are also friction resistant and do not yield debris of size and/or amount that would negatively affect the movement of the belt during its operative lifespan. For example, the lateral formations can be made of polyamide reinforced with molybdenum disulfide. Further details of non-limiting examples of formations suitable for belts that may be used in the printing systems of the present invention are disclosed in WO 2013/136220.

Guide channels in the image forming station ensure accurate placement of the ink droplets on the belt 810. In other areas, such as within the drying station 814 and the impression station 816, lateral guide channels are desirable but less important. In regions where the belt 810 has slack, no guide channels are present.

It is important for the belt 810 to move with constant speed through the image forming station 812 as any hesitation or vibration will affect the registration of the ink droplets of different colors. To assist in guiding the belt smoothly, friction is reduced by passing the belt over rollers 832 adjacent each printing bar 822 instead of sliding the belt over stationary guide plates. The roller 832 need not be precisely aligned with their respective print bars. They may be located slightly (e.g. few millimeters) downstream of the print head jetting location. The frictional forces maintain the belt taut and substantially parallel to print bars. The underside of the belt may therefore have high frictional properties as it is only ever in rolling contact with all the surfaces on which it is guided. The lateral tension applied by the guide channels need only be sufficient to maintain the belt 810 flat and in contact with rollers 832 as it passes beneath the print bars 822. Aside from the inextensible reinforcement/support layer, the hydrophobic release surface layer and high friction underside, the belt 810 is not required to serve any other function. It may therefore be a thin light inexpensive belt that is easy to remove and replace, should it become worn.

To achieve intimate contact between the hydrophobic release layer and the substrate, the belt 810 passes through the impression station 816 which comprises the impression and pressure cylinders 820 and 818. The replaceable blanket 819 releasably clamped onto the outer surface of the pressure cylinder 818 provides the conformability required to urge the release layer of the belt 810 into contact with the substrate sheets 826. Rollers 853 on each side of the impression station ensure that the belt is maintained in a desired orientation as it passes through the nip between the cylinders 818 and 820 of the impression station 816.

As explained in U.S. 61/606,913, temperature control is of paramount importance to the printing system if printed images of high quality are to be achieved. This is considerably simplified in the present invention in that the thermal capacity of the belt is much lower than that of an intermediate transfer member that also incorporated the felt or sponge-like compressible layer. U.S. 61/606,913 also proposed additional layers affecting the thermal capacity of the blanket that were intentionally inserted in view of the blanket being heated from beneath. The separation of the belt 810 from the blanket 819 allows the temperature of the ink droplets to be dried and heated to the softening temperature of the resin using much less energy in the drying station 814. Furthermore, the belt may cool down before it returns to the image forming station which reduces or avoids problems caused by trying to spray ink droplets on a hot surface running very close to the inkjet nozzles. Alternatively and additionally, a cooling station may be added to the printing system to reduce the temperature of the belt to a desired value before the belt enters the image forming station.

Though as explained the temperature at various stage of the printing process may vary depending on the type of the belt and inks being used and may even fluctuate at various locations along a given station, in some embodiments of the invention the temperature on the outer surface of the intermediate transfer member at the image forming station is in a range between 40° C. and 160° C., or between 60° C. and 90° C. In some embodiments of the invention, the temperature at the dryer station is in a range between 90° C. and 300° C., or between 150° C. and 250° C., or between 200° C. and 225° C. In some embodiments, the temperature at the impression station is in a range between 80° C. and 220° C., or between 100° C. and 160° C., or of about 120° C., or of about 150° C. If a cooling station is desired to allow the transfer member to enter the image forming station at a temperature that would be compatible to the operative range of such station, the cooling temperature may be in a range between 40° C. and 90° C.

In some embodiments of the invention, the release layer of the belt 810 has hydrophobic properties to ensure that the ink residue image, which can be rendered tacky, peels away from it cleanly in the impression station. However, at the image forming station the same hydrophobic properties are undesirable because aqueous ink droplets can move around on a hydrophobic surface and, instead of flattening on impact to form droplets having a diameter that increases with the mass of ink in each droplet, the ink tends to ball up into spherical globules. In embodiments with a release layer having a hydrophobic outer surface, steps therefore need to be taken to encourage the ink droplets first to flatten out into a disc on impact then to retain their flattened shape during the drying and transfer stages.

To achieve this objective, it is desirable for the liquid ink to comprise a component chargeable by Brønsted-Lowry proton transfer, to allow the liquid ink droplets to acquire a charge subsequent to contact with the outer surface of the belt by proton transfer so as to generate an electrostatic interaction between the charged liquid ink droplets and an opposite charge on the outer surface of the belt. Such an electrostatic charge will fix the droplets to the outer surface of the belt and resist the formation of spherical globule. Ink compositions are typically negatively charged.

The Van der Waals forces resulting from the Brønsted-Lowry proton transfer may result either from an interaction of the ink with a component forming part of the chemical composition of the release layer, such as amino silicones, or with a treatment solution, such as a high charge density PEI (polyethyleneimine), that is applied to the surface of the belt 810 prior to its reaching the image forming station 812 (e.g.

if the treated belt has a release layer comprising silanol-terminated polydialkylsiloxane silicones).

Without wishing to be bound by a particular theory, it is believed that upon evaporation of the ink carrier, the reduction of the aqueous environment lessens the respective protonation of the ink component and of the release layer or treatment solution thereof, thus diminishing the electrostatic interactions therebetween allowing the dried ink image to peel off from the belt upon transfer to substrate.

It is possible for the belt 810 to be seamless, that is it to say without discontinuities anywhere along its length. Such a belt would considerably simplify the control of the printing system as it may be operated at all times to run at the same surface velocity as the circumferential velocity of the two cylinders 818 and 820 of the impression station. Any stretching of the belt with ageing would not affect the performance of the printing system and would merely require the taking up of more slack by tensioning rollers 850 and 854, detailed below.

It is however less costly to form the belt as an initially flat strip of which the opposite ends are secured to one another, for example by a zip fastener or possibly by a strip of hook and loop tape or possibly by soldering the edges together or possibly by using tape (e.g. Kapton® tape, RTV liquid adhesives or PTFE thermoplastic adhesives with a connective strip overlapping both edges of the strip). In such a construction of the belt, it is essential to ensure that printing does not take place on the seam and that the seam is not flattened against the substrate 826 in the impression station 816.

The impression and pressure cylinders 818 and 820 of the impression station 816 may be constructed in the same manner as the blanket and impression cylinders of a conventional offset litho press. In such cylinders, there is a circumferential discontinuity in the surface of the pressure cylinder 818 in the region where the two ends of the blanket 819 are clamped. There can also be discontinuities in the surface of the impression cylinder which accommodate grippers that serve to grip the leading edges of the substrate sheets to help transport them through the nip. In the illustrated embodiments of the invention, the impression cylinder circumference is twice that of the pressure cylinder and the impression cylinder has two sets of grippers, so that the discontinuities line up twice every cycle for the impression cylinder.

If the belt 810 has a seam, then it is necessary to ensure that the seam should always coincides in time with the gap between the cylinders of the impression station 816. For this reason, it is desirable for the length of the belt 810 to be equal to a whole number multiple of the circumference of the pressure cylinder 818.

However, even if the belt has such a length when new, its length may change during use, for example with fatigue or temperature, and should that occur the phase of the seam during its passage through the nip of the impression station will change every cycle.

To compensate for such change in the length of the belt 810, it may be driven at a slightly different speed from the cylinders of the impression station 816. The belt 810 is driven by two rollers 840 and 842. By applying different torques through the rollers 840 and 842 driving the belt, the run of the belt passing through the image forming station is maintained under controlled tension. In some embodiments, the rollers 840 and 842 are powered separately from the cylinders of the impression station 816, allowing the surface velocity of the two rollers 840 and 842 to be set differently from the surface velocity of the cylinders 818 and 820 of the impression station 816.

Of the various rollers 850, 852, 853 and 854 over which the belt is guided, two are powered tensioning rollers, or dancers, 850 and 854 which are provided one on each side of the nip between the cylinders of the impression station. These two dancers 850, 854 are used to control the length of slack in the belt 810 before and after the nip and their movement is schematically represented by double sided arrows adjacent the respective dancers.

If the belt 810 is slightly longer than a whole number multiple of the circumference of the pressure cylinder then if in one cycle the seam does align with the enlarged gap between the cylinders 818 and 820 of the impression station then in the next cycle the seam will have moved to the right, as viewed in FIG. 1. To compensate for this, the belt is driven faster by the rollers 840 and 842 so that slack builds up to the right of the nip and tension builds up to the left of the nip. To maintain the belt 810 at the correct tension, the dancer 850 is moved down and at the same time the dancer 854 is moved to the left. When the discontinuities of the cylinders of the impression station face one another and a gap is created between them, the dancer 854 is moved to the right and the dancer 850 is moved up to accelerate the run of the belt passing through the nip and bring the seam into the gap. Though the dancers 850 and 854 are schematically shown in FIG. 1 as moving vertically and horizontally, respectively, this need not be the case and each dancer may move along any direction as long as the displacement of one with respect to the other allows the suitable acceleration or deceleration of the belt enabling the desired alignment of the seam.

Figure 3:
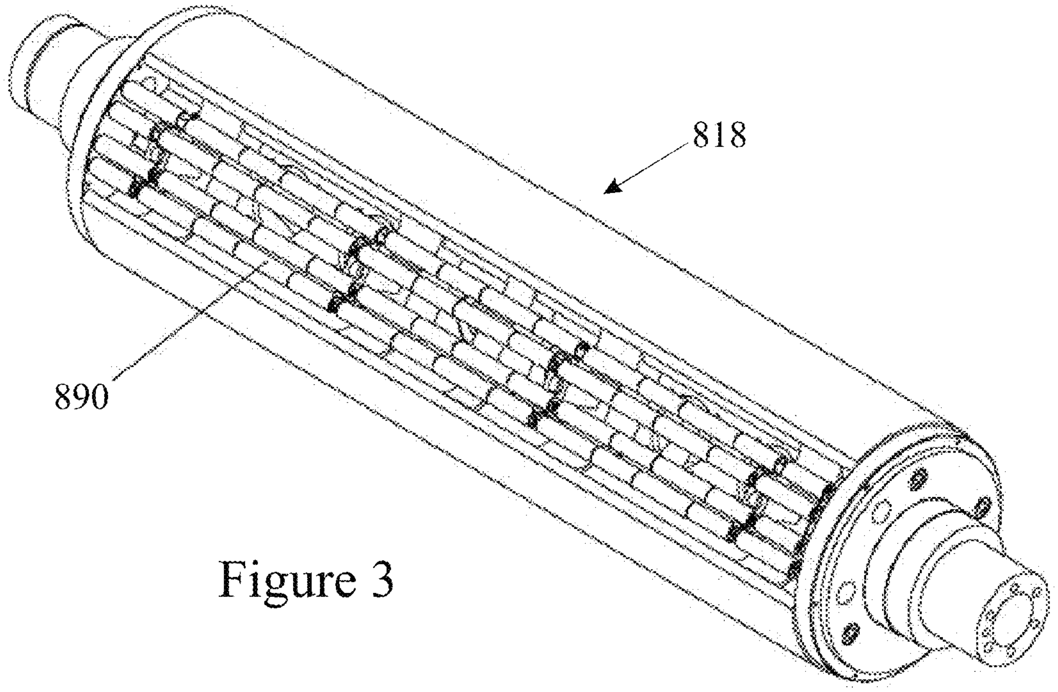
FIG. 3 is a perspective view of a pressure cylinder having rollers within the discontinuity between the ends of the blanket.

To reduce the drag on the belt 810 as it is accelerated through the nip, the pressure cylinder 818 may, as shown in FIG. 3, be provided with rollers 890 within the discontinuity region between the ends of the blanket.

The need to correct the phase of the belt in this manner may be sensed either by measuring the length of the belt 810 or by monitoring the phase of one or more markers on the belt relative to the phase of the cylinders of the impression station. The marker(s) may for example be applied to the surface of the belt and may be sensed magnetically or optically by a suitable detector. Alternatively, a marker may take the form of an irregularity in the lateral formations that are used to tension the belt, for example a missing tooth, hence serving as a mechanical position indicator.

Figure 2:
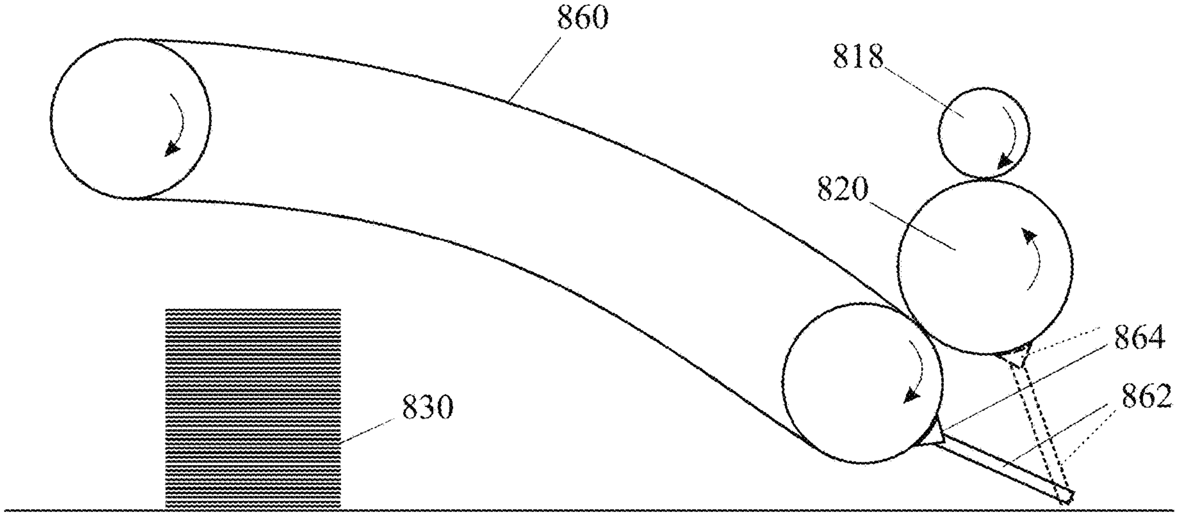
FIG. 2 is a schematic representation of a duplexing mechanism.

FIG. 2 shows the principle of operation of a duplex mechanism to allow the same sheet of substrate to pass twice through the nip of the same impression station, once face up and once face down.

In FIG. 2, after impression of an image on a sheet of substrate, it is picked off the impression cylinder 820 by a discharge conveyor 860 and eventually dropped onto the output stack 830. If a sheet is to have a second image printed on its reverse side, then it may be removed from the conveyor 860 by means of a pivoting arm 862 that carries suckers 864 at its free end. The sheet of substrate will at this time be positioned on the conveyor 860 with its recently printed surface facing away from the suckers 864 so that no impression of the suckers will be left on the substrate.

Having picked a sheet of substrate off the conveyor 860, the pivoting arm 862 pivots to the position shown in dotted lines and will offer what was previously the trailing edge of the sheet to the grippers of the impression cylinder. The feed of sheets of substrates from the supply stack will in this duplex mode of operation be modified so that in alternate cycles the impression cylinder will receive a sheet from the supply stack 828 then from the discharge conveyor 860. The station where substrate side inversion takes place may be referred hereinafter as the duplexing or perfecting station.

Figure 6:
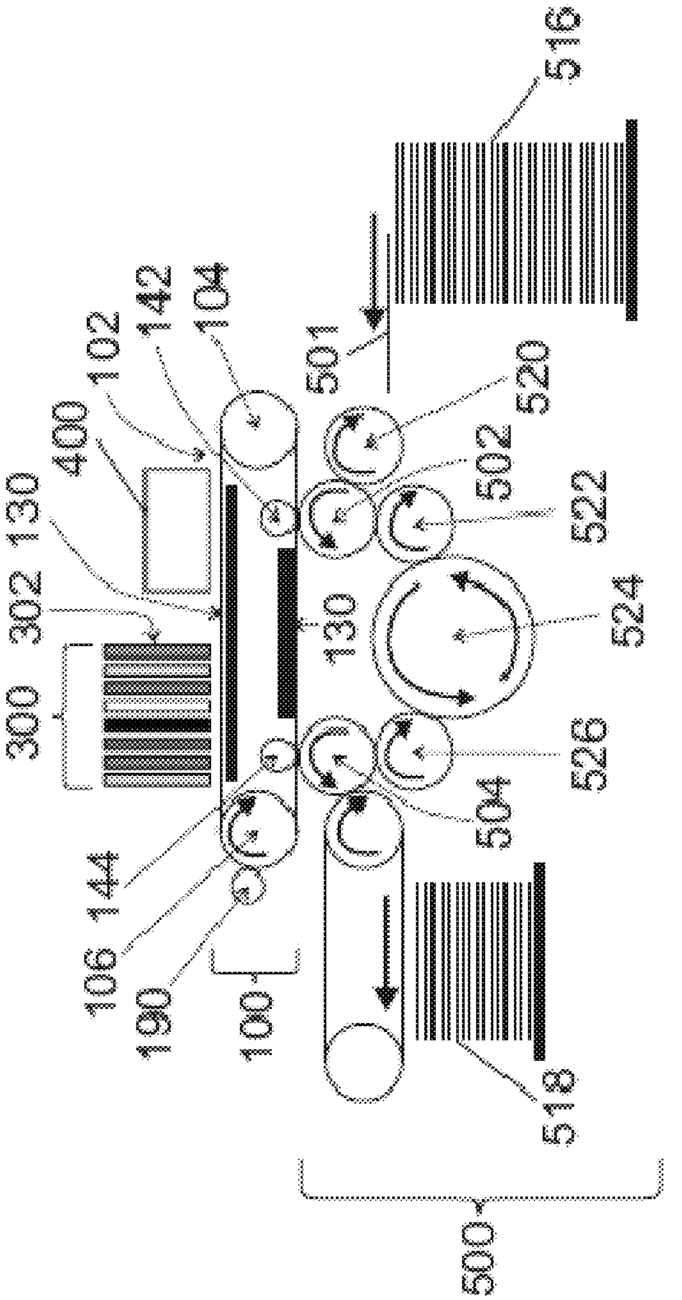
FIG. 6 is a schematic representation of a printing system within which an embodiment of the invention may be used.
Figure 7:
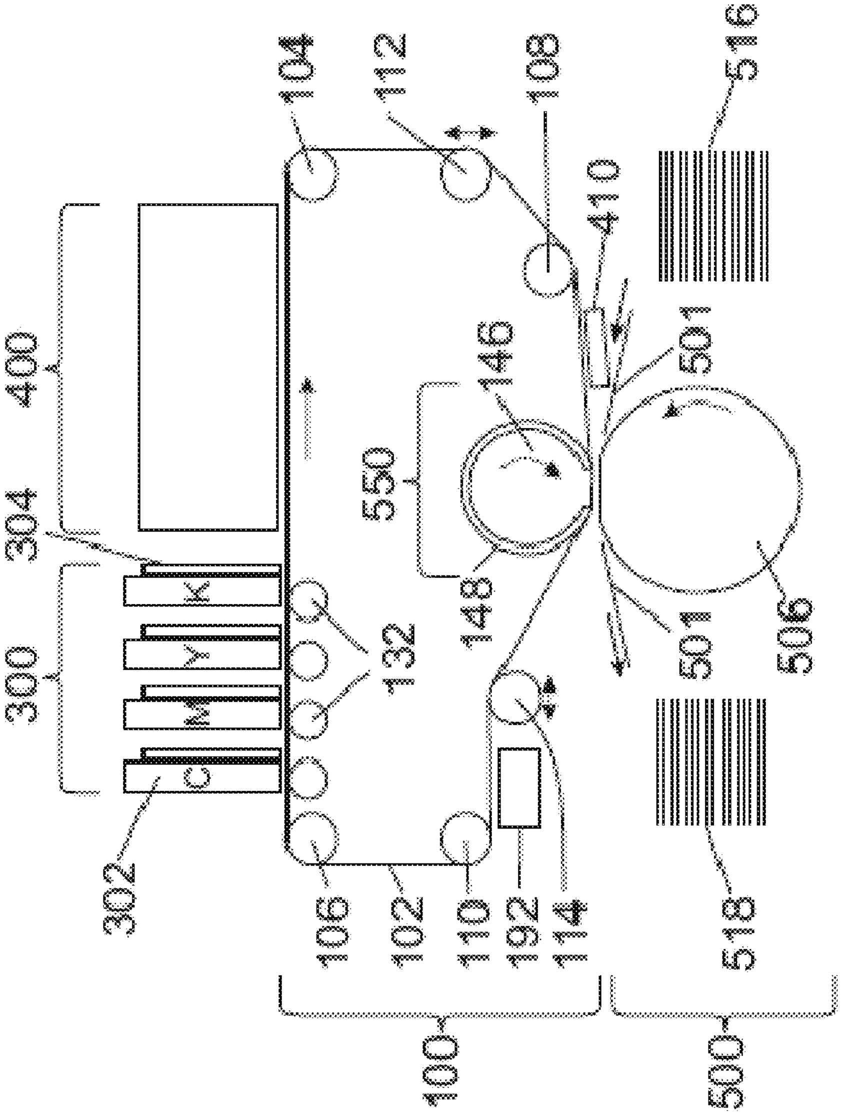
FIG. 7 is a schematic representation of an alternative printing system within which an embodiment of the invention may be used.

Referring now to FIGS. 6 and 7, there is schematically illustrated a printing system having three separate and mutually interacting systems, namely a blanket system 100, an image forming system 300 above the blanket system 100 and a substrate transport system 5000 below the blanket system 100. The blanket system 100 comprises an endless or continuous belt or blanket 102 that acts as an intermediate transfer member and is guided over two or more rollers. Such rollers are illustrated in FIG. 1 as elements 104 and 106, whereas FIG. 7 displays two additional such blanket conveying rollers as 108 and 110. One or more guiding roller is connected to a motor, such that the rotation of the roller is able to displace the blanket in the desired direction, and such cylinder may be referred to as a driving roller. While circulating in a loop, the blanket may pass through various stations briefly described below.

Though not illustrated in the figures, the blanket can have multiple layers to impart desired properties to the transfer member. Thus in addition to an outer layer able to receive the ink image and having suitable release properties, hence also called the release layer, the transfer member may include in its underlying body a compressible layer, which as mentioned may be alternatively positioned on the surface of a pressure roller. Independently of its position in the printing system, the compressible layer predominantly allows the blanket to conform to a printing substrate during transfer of the ink image. When the compressible layer is in the body of the transfer member, the blanket may be referred to as a "thick blanket" and it can be looped to form what can be termed hereinafter as a "thick belt". Alternatively, when the body is substantially devoid of a compressible layer, the resulting structure is said to form a "thin blanket" that can be looped to form a "thin belt". FIG. 6 illustrates a printing system suitable for use with a "thick belt", whereas FIG. 7 illustrates a printing system suitable for a "thin belt".

Independently of the exact architecture of the printing system or of the type of belt used therein, an image made up of dots of an aqueous ink is applied by image forming system 300 to an upper run of blanket 102 at a location referred herein as the image forming station. In this context, the term "run" is used to mean a length or segment of the blanket between any two given rollers over which the blanket is guided.

The Image Forming System

The image forming system 300 includes print bars 302 which may each be slidably mounted on a frame positioned at a fixed height above the surface of the blanket 1020 and include a strip of print heads with individually controllable print nozzles through which the ink is ejected to form the desired pattern. The image forming system can have any number of bars 302, each of which may contain an ink of a different or of the same color, typically each jetting Cyan (C), Magenta (M), Yellow (Y) or Black (K) inks.

Within each print bar, the ink may be constantly recirculated, filtered, degassed and maintained at a desired temperature (e.g. 25-45° C.) and pressure, as known to the person skilled in the art without the need for more detailed description. As different print bars 302 are spaced from one another along the length of the blanket, it is of course essential for their operation to be correctly synchronized with the movement of blanket 102. It is important for the blanket 102 to move with constant speed through the image forming station 300, as any hesitation or vibration will affect the registration of the ink droplets of the respective print bars (e.g. of different colors, shades or effects).

If desired, it is possible to provide a blower 304 following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction (e.g. reducing tendency to bead up) and preventing their movement on the intermediate transfer member. Such preliminary fixing of the jetted droplets in their impinging flattened disc shape may also prevent them from merging into droplets deposited subsequently by other print bars 302. Such post jetting treatment of the just deposited ink droplets, need not substantially dry them, but only enable the formation of a skin on their outer surface.

The image forming station 300 schematically illustrated in FIG. 7 comprises optional rollers 132 to assist in guiding the blanket smoothly adjacent each printing bar 302. The rollers 132 need not be precisely aligned with their respective print bars and may be located slightly (e.g. few millimeters) downstream or upstream of the print head jetting location. The frictional forces can maintain the belt taut and substantially parallel to the print bars. The underside of the blanket may therefore have high frictional properties as it is only ever in rolling contact with all the surfaces on which it is guided.

The Drying System

Printing systems wherein the present invention may be practiced can comprise a drying system 400. Any drying system able to evaporate most, if not all, of the ink liquid carrier out of the ink image deposited at the image forming station 300 to substantially dry it by the time the image enters the impression station is suitable. Such system can be formed from one or more individual drying elements typically disposed above the blanket along its path. The drying element can be radiant heaters (e.g. IR or UV) or convection heaters (e.g. air blowers) or any other mean known to the person of skill in the art. The settings of such a system can be adjusted according to parameters known to professional printers, such factors including for instance the type of the inks and of the transfer member, the ink coverage, the length/area of the transfer member being subject to the drying, the printing speed, the presence/effect of a pre-transfer heater etc.

Thus, in operation, following deposition of the wet ink images, each of which is a mirror image of an image to be impressed on a final substrate, the carrier evaporation may start at the image forming station 300 and be pursued and/or completed at a drying station 400 able to substantially dry the ink droplets to form a residue film of ink solids (e.g. resins and coloring agents) remaining after evaporation of the liquid carrier. The residue film image is considered substantially dry, or the image dried, if any residual carrier they may contain does not hamper transfer to the printing substrate and does not wet the printing substrate. The dried ink image can be further heated to render tacky the film of ink solids before being transferred to the substrate at an impression station. Such optional pre-transfer heater 410 is shown in FIG. 7.

The Impression System

Following deposition of the desired ink image by the image forming system 300, and optionally its drying by the drying system 400 on an upper run of the transfer member, the dried image travels to a lower run of the blanket, which then selectively interacts at an impression station where the transfer member can be compressed to an impression cylinder to impress the dried image from the blanket onto a printing substrate. FIG. 6 shows two impression stations with two impression cylinders 502 and 504 of the substrate transport system 500 and two respectively aligned pressure or nip rollers 142, 144, which can each independently be raised and lowered from the lower run of the blanket. When an impression cylinder and its corresponding pressure roller are both engaged with the blanket passing there-between, they form an impression station. The presence of two impression stations, as shown in FIG. 6, is to permit duplex printing. In this figure, the perfecting of the substrate is implemented by a perfecting cylinder 524 situated in between two transport rollers 522 and 526 which respectively transfer the substrate from the first impression cylinder 502 to the perfecting cylinder 524 and therefrom on its reverse side to the second impression cylinder 504. Though not illustrated, duplex printing can also be achieved with a single impression station using an adapted perfecting system able to refeed to the impression station on the reverse side a substrate already printed on its first side. In the case of a simplex printer, only one impression station would be needed and a perfecting system would be superfluous. Perfecting systems are known in the art of printing and need not be detailed.

In FIG. 7, the impression station 550 is adapted for an alternative "thin belt" transfer member 102 which is compressed during engagement with the impression cylinder 506 by a pressure roller 146 which, to achieve intimate contact between the release layer of the ITM and the substrate, comprises the compressible layer substantially absent from the body of the transfer member. The compressible layer of the pressure roller 146 typically has the form of a replaceable compressible blanket 148. Such compressible layer or blanket is releasably clamped or attached onto the outer surface of the pressure cylinder 146 and provides the conformability required to urge the release layer of the blanket 102 into contact with the substrate sheets 501. Rollers 108 and 114 on each side of the impression station, or any other two rollers spanning this station closer to the nip (not shown), ensure that the belt is maintained in a desired orientation as it passes through the nip between the cylinders 146 and 506 of the impression station 550.

In this system, both the impression cylinder 506 and the pressure roller 146 bearing a compressible layer or blanket 148 can have as cross section in the plane of rotation a partly truncated circular shape. In the case of the pressure roller, there can be a discontinuity where the ends of the compressible layer are secured to the cylinder on which it is supported. In the case of the impression cylinder, there can also be a discontinuity to accommodate grippers serving to hold sheets of substrate in position against the impression cylinder. The impression cylinder and pressure roller of impression station 550 rotate in synchronism so that the two discontinuities line up during cycles forming periodically an enlarged gap at which time the blanket can be totally disengaged from any of these cylinders and thus be displaced in suitable directions to achieve any desired alignment or at suitable speed that would locally differ from the speed of the blanket at the image forming station 300. This can be achieved by providing powered tensioning rollers or dancers 112 and 114 on opposite sides of the nip between the pressure and impression cylinders. Although roller 114 is schematically illustrated in FIG. 7 as being in contact with the release layer, alignment can similarly be achieved if it were positioned on the inner side of the blanket. This alternative, as well as additional optional rollers positioned to assist the dancers in their function, are not shown. The speed differential will result in slack building up on one side or the other of the nip between the pressure and impression cylinders and the dancers can act at times when there is an enlarged gap between the pressure and impression cylinders 146 and 506 to advance or retard the phase of the belt, by reducing the slack on one side of the nip and increasing it on the other.

The Substrate Transport System

FIGS. 6 and 7 depict the image being impressed onto individual sheets 501 of a substrate (e.g. paper, cardboard or plastic) which are conveyed by the substrate transport system 500 from an input stack 516 to an output stack 518 via the impression cylinders 502, 504 or 506. Though not shown in the figures, the substrate may be a continuous web, in which case the input and output stacks are replaced by a supply roller and a delivery roller. The substrate transport system needs to be adapted accordingly, for instance by using guide rollers and dancers taking slacks of web to properly align it with the impression station.

Additional Sub-Systems

In addition to the above-described main sub-systems, printing systems in which embodiments may be practiced can optionally comprise a cleaning station which may be used to gently remove any residual ink images or any other trace particle from the release layer of the ITM, a cooling station to decrease the temperature of the ITM, a treatment station to apply a physical or chemical treatment to the outer surface of the ITM. Such optional steps may for instance be applied at each cycle of the ITM, after a predetermined number of cycles or in between printing jobs to periodically "refresh" the belt.

The printing system may also include finishing stations which can further modify the printed substrate either inline (before being delivered to the output stack) or offline (subsequent to the output delivery) or in combination when two or more finishing steps are performed. Such finishing steps include laminating, gluing, sheeting, folding, glittering, foiling, coating, cutting, trimming, punching, embossing, debossing, perforating, creasing, stitching and binding of the printed substrate; all being known in the field of commercial printing.

Operating Temperatures

Each station of such printing systems may be operated at same or different temperatures. The operating temperatures are typically selected to provide the optimal temperature suitable to achieve the purported goal of the specific station, preferably without negatively affecting the process at other steps or the system at other stations. Therefore as well as providing heating means along the path of the blanket, it is possible to provide means for cooling it, for example by blowing cold air or applying a cooling liquid onto its surface. In printing systems in which a treatment or conditioning fluid is applied to the surface of the blanket, the treatment station may serve as a cooling station.

The temperature at various stage of the process may also vary depending on the exact composition of the intermediate transfer member, the inks and the conditioning fluid, if needed, being used and may even fluctuate at various locations along a given station. For example, the temperature on the outer surface of the transfer member at the image forming station can be in a range between 40° C. and 160° C., or between 60° C. and 90° C. The temperature at the drying station can be in a range between 90° C. and 300° C., or between 150° C. and 250° C., or between 180° C. and 225° C. The temperature at the impression station can in a range between 80° C. and 220° C., or between 70° C. and 100° C., or between 100° C. and 160° C., or of about 120°

C., or of about 150° C., or of about 170° C. If a cooling station is desired to allow the transfer member to enter the image forming station at a temperature that would be compatible to the operative range of such station, the cooling temperature may be in a range between 40° C. and 90° C.

Such exemplary temperature conditions, some being relatively elevated, can put an ITM under non-conventional strains which may affect its performance over time.

As mentioned, the temperature of the transfer member may be raised by heating means positioned externally to the blanket support system, as illustrated by any of heaters 304, 400 and 410, when present in the printing system. Alternatively and additionally, the transfer member may be heated from within the support system. Such an option is illustrated by heating plates 130 of FIG. 6. Though not shown, any of the guiding rollers conveying the looped blanket may also comprise internal heating elements.

It is to be understood that such temperatures, typically elevated with respect to ambient temperature (circa 23° C.), and any change therein during a cycle of the belt, when added to the mechanical stress to which the blanket is typically subject in operation may over time affect the integrity of the ITM. As the quality of the printed image is, among other things, dependent upon the flatness of the ITM as it passes through the image forming station, the present invention seeks to provide an ITM and a method of guiding an ITM that ensure such desired flatness and that avoid meandering of the ITM.

The Blanket

Figure 10A:
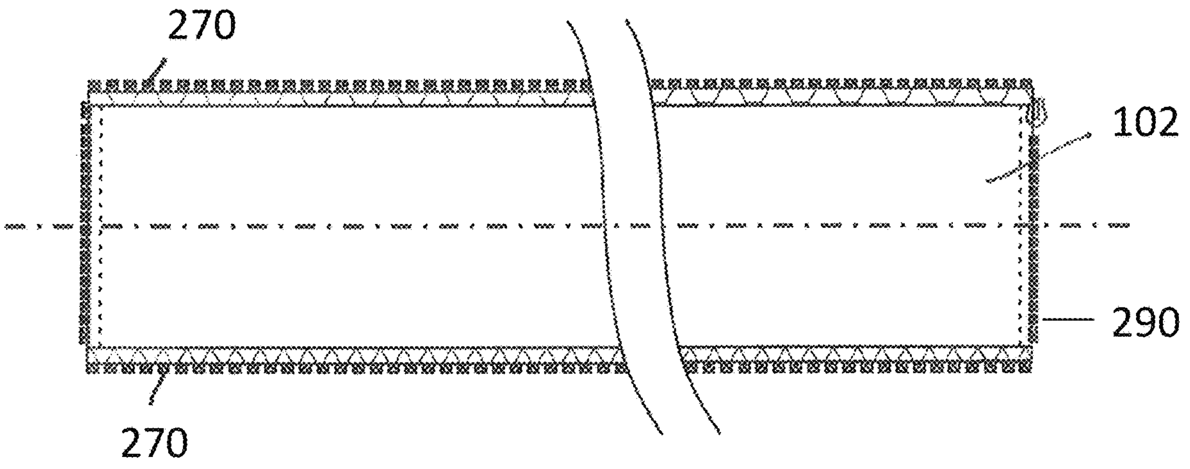
FIGS. 10A and 10B illustrate blankets embodying the present invention.
Figure 10B:
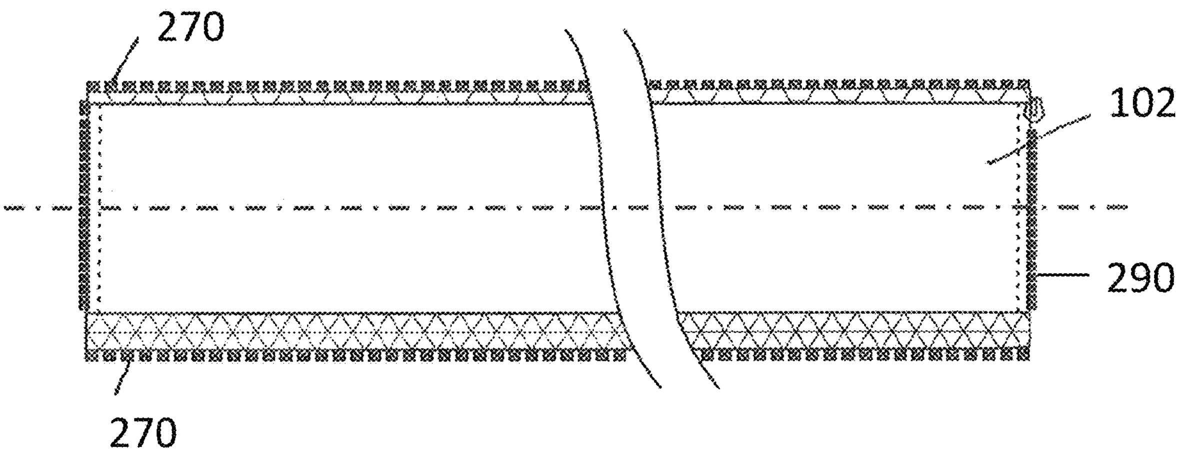

The blanket 102, in one embodiment of the invention, is seamed. In particular, the blanket is formed of an initially flat strip of which the ends are fastened to one another, releasably or permanently, to form a continuous loop. A releasable fastening 290, as schematically illustrated in FIGS. 10A and 10B, may be a zip fastener or a hook and loop fastener that lies substantially parallel to the axes of rollers 104 and 106 over which the blanket is guided. A permanent fastening may be achieved by the use of an adhesive or a tape. In some embodiments, the belt may be formed by more than one blanket strip, each aligned and secured with the end of the adjacent strip, increasing accordingly the number of seams the belt may comprise.

In order to avoid a sudden change in the tension of the blanket as the seam passes over these rollers, it is desirable to make the seam, as nearly as possible, of the same thickness as the remainder of the blanket. It is also possible to incline the seam relative to the axis of the rollers but this would be at the expense of enlarging the non-printable image area.

Alternatively, the blanket can be seamless, hence relaxing certain constraints from the printing system (e.g. synchronization of seam's position). Whether seamless or not, the primary purpose of the blanket is to receive an ink image from the image forming system and to transfer that image dried but undisturbed to the impression stations.

To allow easy transfer of the ink image at each impression station, the blanket has a thin upper release layer that is hydrophobic. The outer surface of the transfer member upon which the ink can be applied may comprise a silicone material. Under suitable conditions, a silanol-, sylyl- or silane-modified or terminated polydialkylsiloxane silicone material and amino silicones have been found to work well. However the exact formulation of the silicone is not critical as long as the selected material allows for release of the image from the transfer member to a final substrate.

The strength of the blanket can be derived from a support or reinforcement layer. In one embodiment, the reinforcement layer is formed of a fabric that is substantially inextensible, both widthways and lengthways.

The fibers of the reinforcement layer may be high performance fibers (e.g. aramid, carbon, ceramic, glass fibers etc.).

The blanket may comprise additional layers between the reinforcement layer and the release layer, for example to provide conformability and compressibility of the release layer to the surface of the substrate. Other layers provided on the blanket may act as a thermal reservoir or a thermal partial barrier and/or to allow an electrostatic charge to the applied to the release layer. An inner layer may further be provided to control the frictional drag on the blanket as it is rotated over its support structure. Other layers may be included to adhere or connect the afore-mentioned layers one with another or to prevent migration of molecules therebetween.

Advantageously, a thin belt, which may consist of a hydrophobic release surface layer, an inextensible reinforcement/support layer and a high friction underside, optionally including a conformation layer, may therefore be a light inexpensive belt that is easy to remove and replace, should it become worn.

Figure 8A:
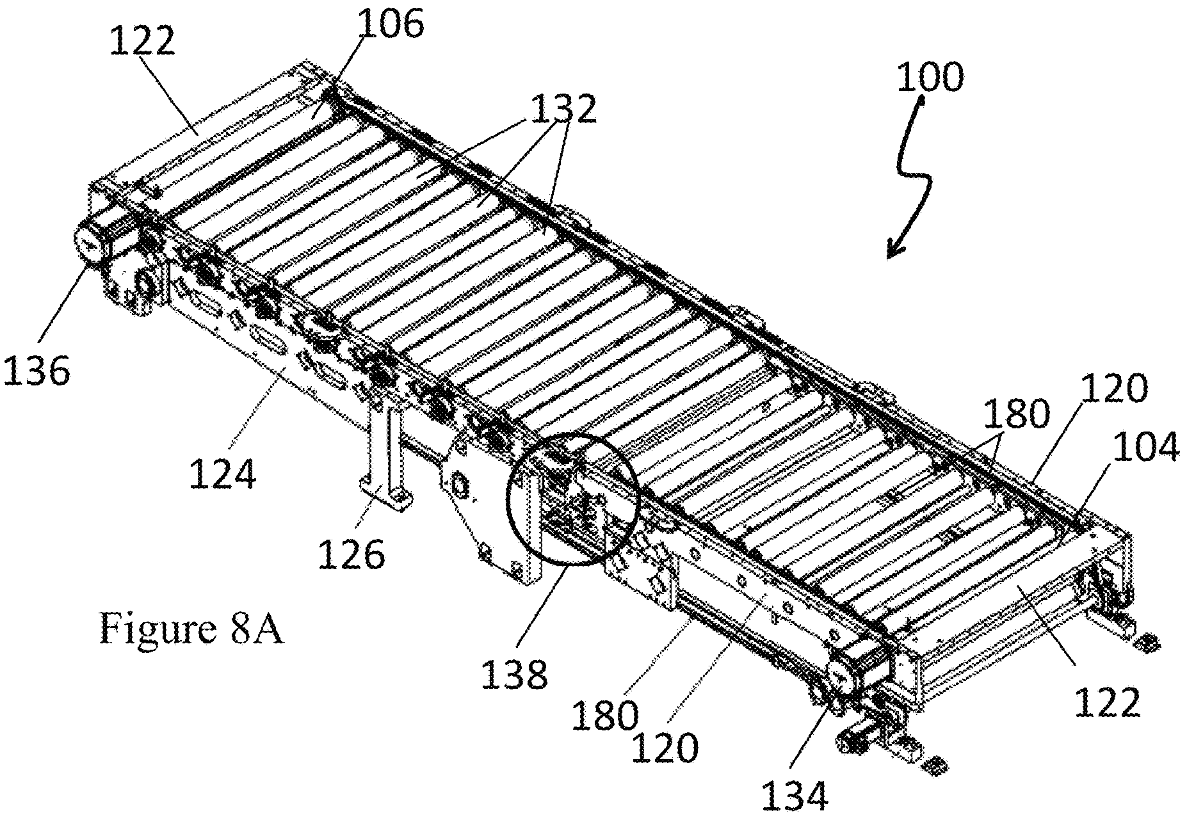
FIG. 8A illustrates a perspective view of a blanket support structure.

FIG. 8A schematically illustrates an embodiment of a support structure for the blanket, whether thin or thick, where two elongate outriggers 120 are interconnected by a plurality of cross beams 122 to form a horizontal ladder-like frame 124 on which the remaining components are mounted. Frame 124 may further include supporting elements 126 allowing connecting the blanket system 100 to other components of the printing system. In some embodiments, the supporting frame 124 may be formed by alignment of shorter frame segments that may be attached one to the other at segment junctions 138.

Rollers 104 and 106 are mounted at each end of outriggers 120, and can be rotated to induce displacement of the ITM by respective electric motors 134 and 136. The motor 134 serves to drive the blanket clockwise. The motor 136 provides a torque reaction and can be used to regulate the tension in the upper run of the blanket (not shown in present figure). The motors may operate at the same speed in an embodiment in which the same tension is maintained in the upper and lower runs of the blanket. Alternatively, they may operate at different speed when higher tension is sought in the upper run.

Additional guiding rollers (e.g. 132) may be mounted across the outriggers in parallel with the axis of rollers 104 and 106. Such an embodiment is incorporated in the printing system illustrated in FIG. 7. Alternatively, thermally conductive support plates 130 can mounted to form a continuous flat support surface in particular on the top side of the support frame 124. Such an embodiment is incorporated in the printing system illustrated in FIG. 6. Plates 130 can be heated to modify the temperature of blanket 102 as desired.

Figure 8B:
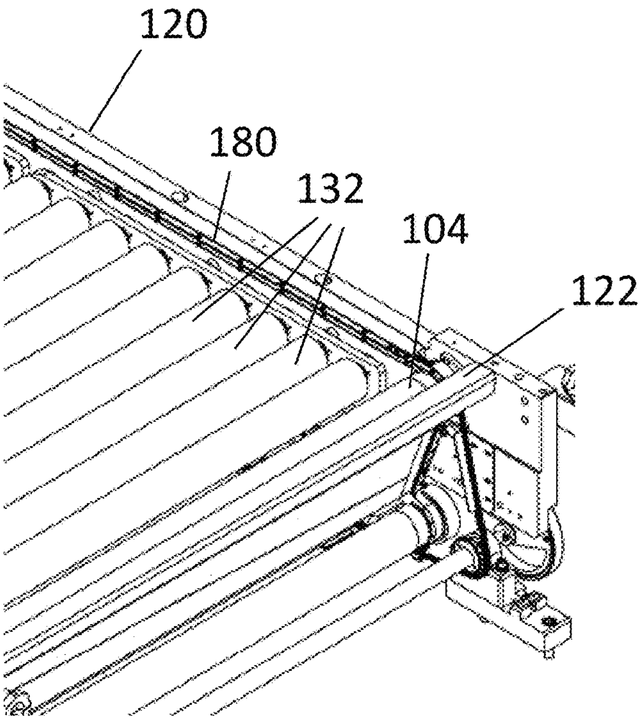
FIG. 8B shows a magnified section of an alternative blanket support structure.

As better shown in FIG. 8B, which displays a magnified section of a blanket support structure such as illustrated in FIG. 8A, each of the outriggers 120 supports a continuous channel or track 180, which can engage formations on the side edges of the blanket to maintain the blanket taut in its width ways direction. FIGS. 8A and 8B relate to two distinct exemplary blanket conveyers, differing in the spacing there can be between the guiding rollers. The side tracks allow the lateral position of the blanket to remain fixed while the blanket is being moved in a longitudinal direction, for transferring an image formed on the surface of the blanket by the image forming system to the impression station.

Figure 9:
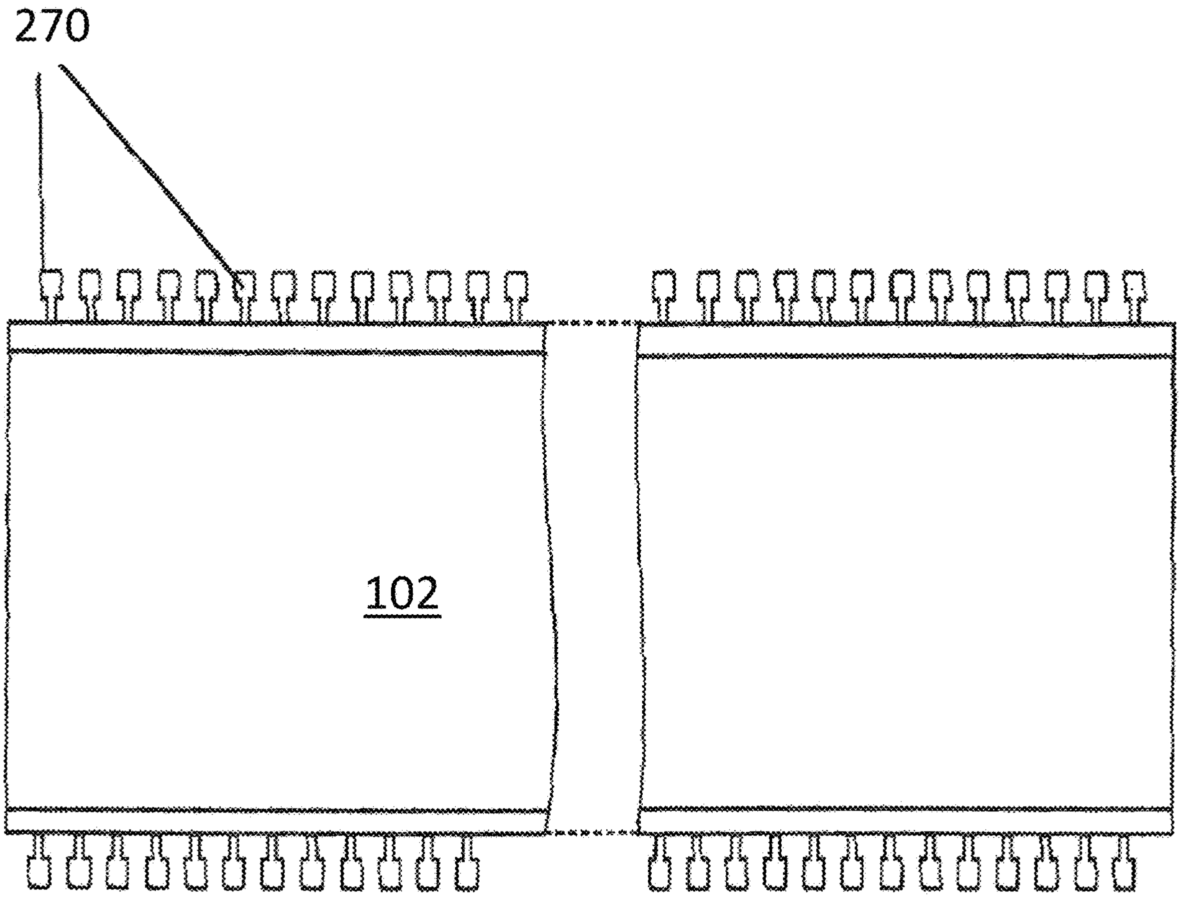
FIG. 9 illustrates a blanket having formations.

FIG. 9 illustrates a blanket 102 having a plurality of formations 270 formed on both lateral edges of the blanket. The tracks 180 include features for engaging with the formations on the side edges of the blanket 102.

The formations may be spaced projections, such as the teeth of one half of a ZIP fastener. Alternatively, the formations may be a continuous flexible bead of greater thickness than the blanket. The lateral track guide channel 180 may have any cross-section suitable to receive and retain the blanket lateral formations and maintain the blanket taut.

The formations on one of the lateral edges 272 of the blanket are secured to the belt in such a manner as to allow the formations to remain at a substantially fixed distance from a notional centerline of the belt. That is to say, there is substantially no elasticity between the coupling of the formations to the belt. For example, the formations may be sewn or otherwise directly attached to the edge of the blanket or a substantially inelastic coupling member may be used to couple the formations to the side of the blanket. This ensures that the lateral position of the blanket does not vary with respect to the position of the image forming station. For this purpose, the lateral formations on this edge of the blanket need also be substantially inelastic. This side of the blanket, coupling members, if any, and formations thereon may be hereinafter referred to as "inelastic".

The formations on the second edge 274 are connected to the belt by way of a coupling member arranged to allow the distance of the formations on the second edge to vary from the notional centerline of the belt to allow the belt to be maintained under lateral tension as the belt surface moves relative to the image forming station. By maintaining the belt under lateral tension this minimizes the risk of undulations forming in the surface of the intermediate transfer medium, thereby allowing for an image to be correctly formed by the image forming station on the surface of the intermediate transfer medium.

Any suitable form of coupling member may be used for maintaining the belt under lateral tension, for example an elastically extensible member such as a rubber strip or elastic webbing. Preferably, suitable materials for the coupling member can resist elevated temperatures in the range of about 50° C. to 250° C.

FIG. 10A illustrates a plan view of a blanket in which formations 270 on both lateral edges 272 and 274 of the blanket are at substantially the same distance from a notional centerline of the belt. FIG. 10B illustrates a plan view of the same blanket shown in FIG. 10A where the formations on the second edge, which are for instance coupled to the blanket with an elastically extensible member, have been extended, under tension, away from the notional centerline, thereby resulting in these formations 270 being a greater distance from the notional centerline than those on the first edge. This relatively protracted edge is illustrated as 274'. By contrast with the opposite side, this edge of the blanket, coupling members, if any, and formations thereon may be hereinafter referred to as "elastic".

As stated above, formations 270 are received in a respective guide channel 180, which in conjunction with the coupling member, if included, maintain the belt taut in its width ways dimension.

Figure 11:
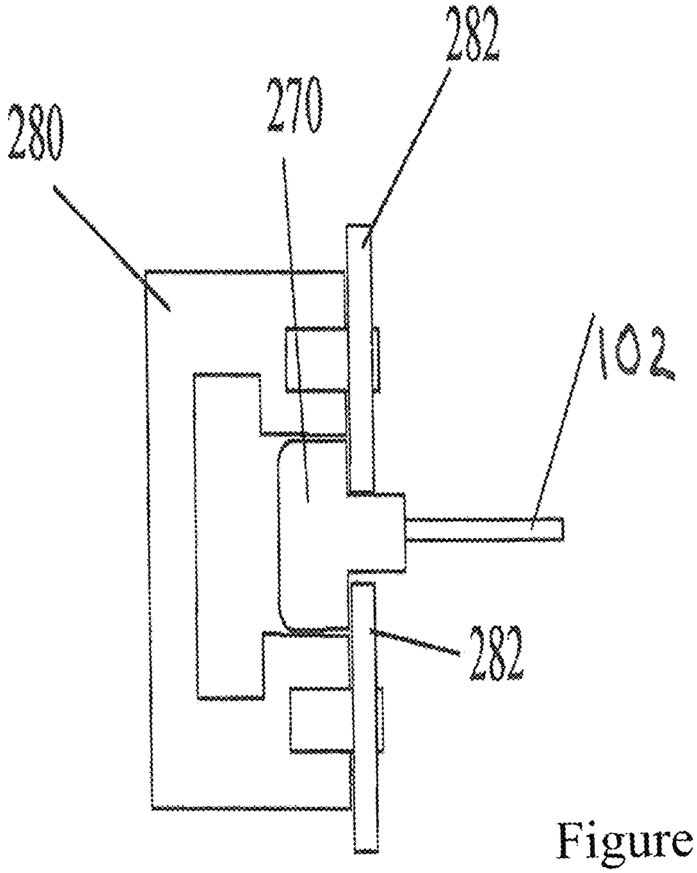
FIG. 11 illustrates how the blanket formations engage within a mounting system.

With reference to FIG. 11, to reduce friction, the guide channel 280 may have rolling bearing elements 282 to retain the formations 270 or the beads within the channel 280, where guide channel 280 corresponds to track 180 in FIGS. 8A and 8B.

The projections may be made of any material able to sustain the operating conditions of the printing system, including the rapid motion of the belt. Suitable materials can resist elevated temperatures in the range of about 50° C. to 250° C. Advantageously, such materials are also friction resistant and do not yield debris of size and/or amount that would negatively affect the movement of the belt during its operative lifespan. As mentioned, the formations need not be made of the same materials for both edges, not have the same mechanical properties. Formations can be made for example of polyacetal.

Guide channels in the image forming station ensure accurate placement of the ink droplets on the belt 102. In other areas, such as within the drying station and the impression station, lateral guide channels are desirable but less important. In regions where the belt 102 has slack, no guide channels are present.

The lateral tension applied by the guide channels and coupling member need only be sufficient to maintain the belt 102 flat and in contact with support structure, be it heating plates 130 or rollers 132, as it passes beneath the print bars 302.

The elasticity of the belt lateral projections, whether or not in conjunction with a coupling member, in the direction of the tension that may be sustained in operation can be approximated as a spring constant k. In the linear-elastic range of a material, k is the factor characteristic of the elastic body setting the relation between the force F needed to extend the material and the distance X of extension resulting from such force. This can be mathematically represented by $F=k*X$, the force F being typically expressed in newtons (N or kg·m/s2), the distance X in meters (m) and the spring constant k in newtons per meter (N/m). The spring constant may vary as a function of temperature and as a function of time, as some materials may for instance loose stiffness under prolonged tensioning. However, above a certain load a material may be deformed to the extent its behavior is no longer in the linear elastic range.

The lateral projections, jointly with the coupling member when applicable, can display a range of spring constants compatible with the printing system and its operating conditions. Materials having higher spring constant are typically more suitable than materials having lower spring constant for use in printing systems operating under elevated lateral tensioning and/or elevated temperature and/or elevated speed of belt displacement and any such operating condition that may increase the strain on the lateral projections.

On the inelastic side of the blanket, the spring constant of the lateral formations and of the coupling member if present, kif, can be greater or equal to the spring constant of the belt in its lateral direction, kb, which can be mathematically denoted by $kif \geq kb$. On the elastic side of the blanket, the spring constant of the lateral formations and of the coupling member if present, kef, is at least below the spring constant of the belt in its lateral direction. This can be mathematically represented by $kef<kb$. In some embodiments, the spring constant of the formations and coupling member on the elastic side of the blanket kef is less than 50%, or less than 40%, or less than 30%, or less than 20%, or less than 10% of kb the spring constant of the blanket in its lateral direction.

The relative elasticity of formations on the opposite side of the blanket can be modified by impregnation of the coupling member.

To mount a blanket on its support frame, according to one embodiment of the invention, entry points are provided along tracks 180. One end of the blanket is stretched laterally and the formations on its edges are inserted into tracks 1800 through the entry points. Using a suitable implement that engages the formations on the edges of the blanket, the blanket is advanced along tracks 180 until it encircles the support frame. The ends of the blanket are then fastened to one another to form an endless loop or belt. Rollers 104 and 106 can then be moved apart to tension the blanket and stretch it to the desired length.

Sections of tracks 180 may be telescopically collapsible to permit the length of the track to vary as the distance between rollers 104 and 106 is varied.

Following installation, the blanket strip may be adhered edge to edge to form a continuous belt loop by soldering, gluing, taping (e.g. using Kapton® tape, RTV liquid adhesives or PTFE thermoplastic adhesives with a connective strip overlapping both edges of the strip), or any other method commonly known. Any method of joining the ends of the belt may cause a discontinuity, referred to herein as a seam, and, as stated above, it is desirable to avoid an increase in the thickness or discontinuity of chemical and/or mechanical properties of the belt at the seam.

In some embodiments, lateral tensioning is passively achieved. Passive tensioning can be achieved, for instance, by using an ITM having in combination with the lateral formations secured on each the ITM edges, an overall width less than the distance between the lateral tracks into which such formation can be guided. The difference in dimensions is the ITM stretching factor. Alternatively and additionally, lateral tensioning can be actively achieved. For instance, the lateral track at least on one side of the ITM can be laterally displaced.

Some advantages of the present invention are illustrated in the below examples.

Example 1 Effect of Elastic Lateral Stripe

Figure 12:
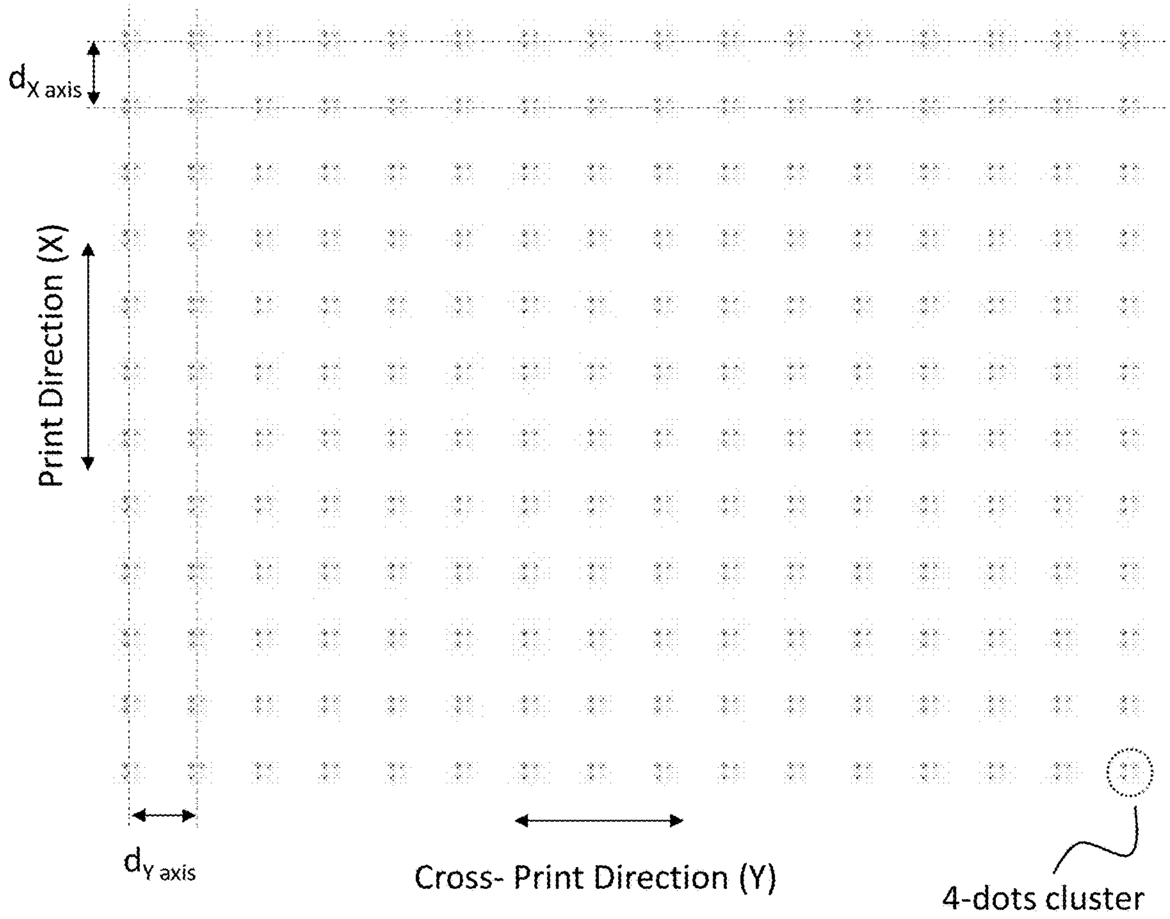
FIG. 12 illustrates a digital input or printed output image that may serve to assess one of the advantages of the present invention.

Proper registration of the printed image is amongst the most desired features defining quality printing. In the present experiment, it was assessed by jetting on the ITM being studied a test image comprising arrays of clusters of four colored dots, each dot of a different basic color (C, M, Y, K). FIG. 12 illustrates such a test image, wherein each of the four dots of each cluster is regularly positioned relative to the other dots of the same cluster. In the figure, the dots are equidistant (e.g. their respective centers forming a square shape having edges of 80 pixel length). The clusters can be aligned at predetermined distances along the printing direction (X-axis) and the cross-printing lateral direction (Y-axis) forming a grid of "columns" and "rows" of clusters respectively spaced by dY-axis and dX-axis. The number of clusters of dots in such grid depends on the number of columns and rows in the image, which preferably spans the full length of the print bar/width of the ITM.

Figure 13:
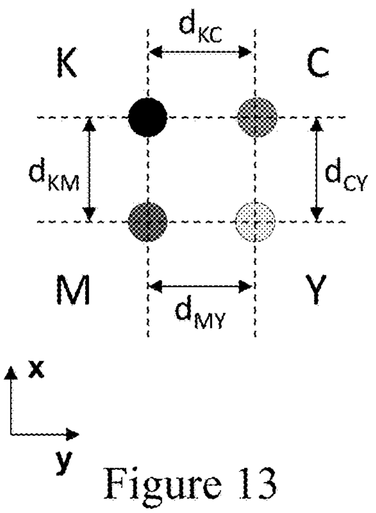
FIGS. 13, 14A and 14B show magnified views of sections of the digital or printed image illustrated in FIG. 12.
Figure 14A:
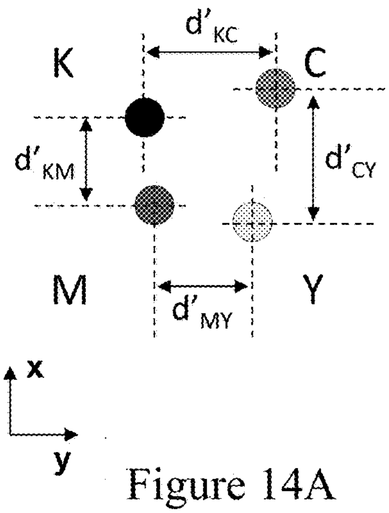
Figure 14B:
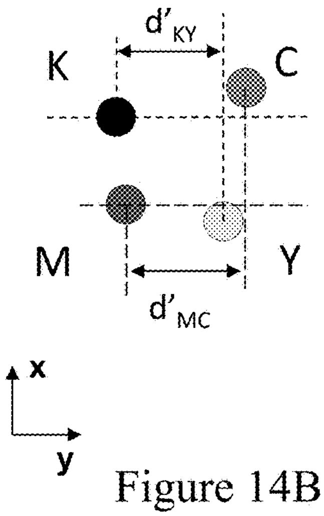

The registration, and deviation therefrom, were measured as follows. The digital test image was ink deposited at 1200 dpi by an image forming station on the ITM being assessed and transferred therefrom to a printing substrate (e.g. paper). The printed test image was scanned (Epson Scanner Expression 10000 XL) and the actual positioning of the physical dots was compared to their digital source positioning. As partially illustrated in FIG. 13, the four colored dots of any cluster define six pairs of colors and six distances therebetween. The horizontal distance between the centers of the black dot and the cyan dot is denoted dKC, the horizontal distance between the centers of the magenta dot and the yellow dot is denoted dMY, the vertical distance between the centers of the black dot and the magenta dot is denoted dKM, and the vertical distance between the centers of the cyan dot and the yellow dot is denoted dCY. In addition to the distances within the pairs of colors formed on the edges of the square shape, the distances between the dots on internal diagonals were measured, dKY and dMC (not shown on Figure) respectively representing the distance between the centers of the black dot and the yellow dot and between the centers of the magenta dot and cyan dot, when both dots of the pair are "projected" orthogonally on a same virtual line. As mentioned, in the digital test image the six distances defined by a cluster (i.e. dKC, dMY, dKM, dCY, dKY and dMC) are known and constant. In the printed test image, however, such distances may fluctuate. FIG. 14 illustrates such a printed cluster wherein dot positions deviate from digital source. The black dot serving as reference, the "printed" distances are measured between the centers of any two dots of interest, while both are projected on the same virtual line (e.g. a horizontal line when measuring in the Y-direction or a vertical line when measuring in the X-direction). The measured distances are termed d'KC, d' MY, d' KM, d'CY, d' KY and d'MC, each corresponding to its known digital counterpart. For each cluster, the maximal observed distance in any of the X- or Y-direction was selected to represent the cluster in said direction. Hence, in the cluster illustrated in FIG. 14A, distance d'CY 'characterizes' the cluster in the X-direction, while d'KC represents it in the Y-direction. Each maximal distance observed within a cluster along the X- or Y-direction serves thereafter to calculate the "maximal deviation value" (MDV) as the difference between the maximal observed distance and its digital counterpart in each direction. For convenience, each value V that may be calculated in the X- or Y-direction can be also referred to as VX and VY, respectively. Hence, in the case of the cluster illustrated in FIG. 14, the maximal deviation value can be mathematically expressed by MDVX=d'CY−dCY and MDVY=d'KC−dKC. Such measurements are repeated for all clusters of the image, whether all aligned and analyzed in the X-direction or the Y-direction. In the illustration of FIG. 12, such measurements are repeated for each row of clusters along the Y-direction 15 more times. The 16 horizontally aligned MDVY calculated values are then mathematically averaged and each line of clusters is then assigned an Average Maximal Deviation (AMD) which in the case of the Y-direction could be also termed AMDY. The same analysis can be done in the perpendicular direction for each column of clusters along the X-direction, where all MDVX calculated values of the relevant clusters are mathematically averaged to represent each column by way of their respective AMDX values.

Figure 15:
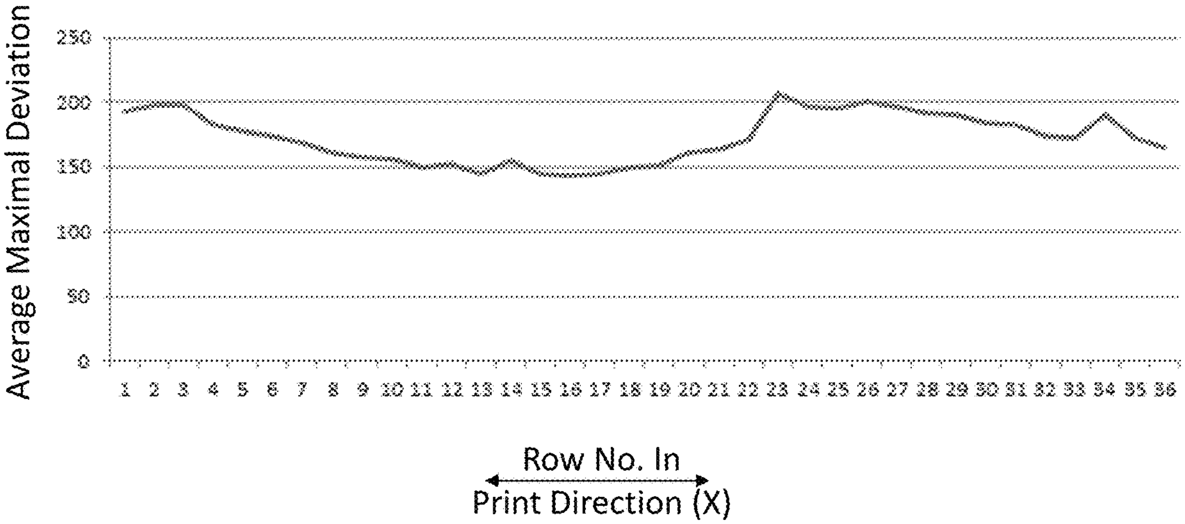
FIG. 15 is a plot displaying the average deviation in registration (in micrometers) as a function of position within the image along its printing direction.

FIG. 15 is a typical plot showing the AMD of a printed image in one direction, for instance within each of the rows of dots clusters comprised in the printed test image. In the figure, 36 such rows are represented, however such number needs not be limiting. For each such plot (and direction), an average Image Mean Deviation (IMD) can be calculated, as well as the standard deviation (SD) from all points therefrom. In addition, the Minimum and Maximum Average Maximal Deviations AMD of a row or a column of clusters, depending on the direction being considered, were recorded for each image tested in the various experiments described below.

All studied blankets were run under the same operating conditions of temperatures and speed in a printing system as previously described. The temperature at the image forming station was about 100° C. on the surface of the transfer member and the speed was 0.78 m/sec. All blankets were "thin blankets" substantially devoid of compressible layer and shared the same chemical composition, having a release layer made of polydimethyl siloxane silicone (thickness of about 50 μm) and a reinforcement layer including a substantially inelastic glass fiber fabric embedded into a silicon rubber (thickness of about 470 μm, the fiber glass accounting for about 180 μm of the body thickness). The glass fibers were plain weaved at a density of 16*16 yarns per centimeter. The blankets differed only by the presence and/or type of elastic stripe on their lateral edges. A blanket having lateral formations attached in a non-elastic manner on both sides (items 1 and 2 in the below table) served as control. Items 3 and 4 of the below table relate to a blanket according to the invention having one elastic stripe (zipper bound by one elastic connector) on one side and a relatively non-elastic one on the other side. Items 5 and 6 of the below table relate to a blanket according to the invention having one elastic stripe (zipper bound by two elastic connectors) on one side and a relatively non-elastic one on the other side. Items 7 and 8 of the below table relate to a comparative blanket having elastic stripes (zipper bound by one elastic connector) on both sides, such blanket being therefore "symmetrical" as opposed to the "asymmetrical" blankets of the invention.

Plots of Average Maximal Deviation from registration (in μm) as a function of position along the printing direction of the test image, as shown in FIG. 15, were prepared for all tested blankets. The results, along both directions of the printed image, were further averaged to generate the Image Mean Deviation and are shown in the below table together with the standard deviation (SD) among all measured points along a given direction, the minimum and the maximum Average Maximal Deviation observed for each tested blanket. Results are provided for deviations from proper registration observed in the X and Y directions.

| No. | Elastic Stripe | Direction | Image Mean Deviation | SD from IMD | Minimum AMD | Maximum AMD |
|---|---|---|---|---|---|---|
| 1 | None | X | 300 μm | 80 μm | 150 μm | 550 μm |
| 2 | None | Y | 240 μm | 25 μm | 180 μm | 350 μm |
| 3 | One Side | X | 270 μm | 80 μm | 120 μm | 580 μm |
| 4 | One Side | Y | 120 μm | 12.5 μm | 80 μm | 150 μm |
| 5 | One Side × 2 | X | 400 μm | 82.5 μm | 220 μm | 550 μm |
| 6 | One Side × 2 | Y | 150 μm | 20 μm | 100 μm | 180 μm |
| 7 | Two Sides | X | 325 μm | 110 μm | 100 μm | 550 μm |
| 8 | Two Sides | Y | 230 μm | 25 μm | 180 μm | 280 μm |

As can be seen from the above table, referring to deviations from registration in the lateral direction (Y) across the blanket, item 4 displays a surprisingly advantageous behavior. The Image Mean Deviation as observed using the blanket of item 4, 120 μm, is about half the IMD observed for the "symmetrical" blankets of item 2 (240 μm) and item 8 (230 μm), respectively lacking elastic stripes or harboring two such stripes on both sides of the blanket. Importantly, the standard deviation among the points measured across the blanket as compared to the calculated IMD is also significantly lower (12.5 μm), a benefit further confirmed by the lowest minimum and maximum AMD of all tested blankets.

The spring constant of the elastic stripe used on the single "elastic" side of the blanket which served to perform experiments 3 and 4 or on both sides of the blanket as in experiments 7 and 8 was of about $3.6\times10^{-3}$ N/m. The spring constant of the "double-elastic stripe" used on a single side of the blanket which served to perform experiments 5 and 6 was of about $2.1\times10^{-3}$ N/m. For comparative purposes the "spring constant" of the blanket per se, to which the lateral formations are secured, was typically between $18\times10^{-3}$ N/m and $25\times10^{-3}$ N/m, and generally of about $20\times10^{-3}$ N/m. The non-elastic stripes secured either on both side of the blanket as in experiments 1 and 2 or on a single side as in experiments 3 to 6 had a spring constant of about $60\times10^{-3}$ N/m. Such values, if not provided by the supplier, were assessed as detailed in Example 2.

Example 2 Effect of Elasticity of Lateral Stripe

As explained, the elastic properties of a material within its linear elastic range can be approximated by a spring constant k generally expressed in Newton/meter (N/m). This factor can be readily assessed under desired conditions by applying a known force to a sample of known dimensions and measuring the distance of displacement of a point of reference as a function of the applied force at a time the sample reaches equilibrium (i.e. no extension, nor contraction). Such measurements were performed using a tensiometer (Lloyd Materials Testing, LRX Plus), repeated at least three times and averaged. Unless otherwise stated, and except for the ITM sample which had a length of 250 mm, the samples tested by such method had a width of 20 mm and a length of 10 mm or 20 mm (depending on the width of the half-zipper being considered, as detailed below), the force being applied in the longitudinal direction of the sample. The spring constants of lateral formations attached to various coupling members were assessed and their effect on registration determined as explained in Example 1.

In the present experiments, the ITMs had on their "inelastic" side a half-zipper directly secured to the blanket by adhesion and sewing. The zipper teeth were made of polyoxymethylene and the half-zipper, with a 10 mm wide inelastic coupling member, was used as purchased (Paskal Israel, Cat. No. P15RS47010009999) to serve as lateral formations for the ITM. The "spring constant" of these "inelastic edge formations" was found to be $60\times10^{-3}$ N/m. For comparison, the ITM used in the present experiments, which was as described in Example 1, displayed a spring constant of about $20\times10^{-3}$ N/m.

The half-zippers attached on the opposite "elastic" side (Paskal Israel, Cat. No. P15RS470100099EL), eventually through a coupling member of different width, displayed at ambient temperature (circa 23° C.) the spring constants reported in the below table.

For convenience the lateral formations and the coupling member being tested on the elastic side of the belt are jointly referred to in the below table as the "elastic edge". The sample used as unilateral elastic edge for experiments 1 and 2 was a half-zipper attached to an elastic fabric made of polyester and elastane having a width of about 10 mm (the elastic fabric being as originally provided by the supplier of the "elastic zipper"), the sample used for experiments 3 and 4 was the same with a coupling member having a doubled width (~20 mm). The samples used in experiments 5-6 correspond to previous ones wherein the elastic coupling member, having a width of 10 mm, is further impregnated with a thin layer of about 30 μm RTV (room temperature vulcanization) silicone (Dow Corning® RTV 734). The samples used in experiments 7-8 correspond to previous ones the impregnation of the coupling member, having a width of 10 mm, being with a thick layer of about 570 μm of the same RTV silicone. Briefly, the fabric was coated with the RTV silicone, the silicone layer was gently manually pressed into the fabric with a flat instrument to facilitate impregnation and allowed to cure at ambient temperature according to RTV manufacturer. As a result of the impregnation, the overall elasticity of the elastic edge was reduced, as confirmed by an increase in the spring constant. The impact of the relative elasticity of the elastic edge, as assessed by its spring constant, on registration is reported in the table below. The values reported in connection with registration are the average and SD of image mean deviation for all points measured across the segments of the target image, both in the printing direction X and in the perpendicular one Y, which were calculated as explained in Example 1.

| No. | Elastic Edge | Coupling Member | Spring Constant | Direction | Image Mean Deviation | SD of IMD |
|---|---|---|---|---|---|---|
| 1 | Half-Zipper | 10 mm | 3.6 * $10^{-3}$ N/m | X | 270 μm | 80 μm |
| 2 | Half-Zipper | 10 mm | " | Y | 120 μm | 12.5 μm |
| 3 | Half-Zipper | 20 mm | 2.1 * $10^{-3}$ N/m | X | 400 μm | 82.5 μm |
| 4 | Half-Zipper | 20 mm | " | Y | 150 μm | 20 μm |
| 5 | +Thin RTV | 10 mm | 5.1 * $10^{-3}$ N/m | X | 300 μm | 61 μm |
| 6 | +Thin RTV | 10 mm | " | Y | 150 μm | 8.8 μm |
| 7 | +Thick RTV | 10 mm | 5.7 * $10^{-3}$ N/m | X | 275 μm | 58.5 μm |
| 8 | +Thick RTV | 10 mm | " | Y | 190 μm | 8.5 μm |

As can be seen from the above table, the spring constant of the elastic edge on only one side of the blanket affects the standard deviation of the IMD predominantly in the Y direction. For comparison in the Y direction replacing the above described elastic edges by a non elastic edge, i.e. having a spring constant of $60\times10^{-3}$ N/m on both sides of the blanket, yielded values of 190 μm±25 μm. In the range of spring constant tested, it seems that the elastic edge need not be too elastic. It is believed that a spring constant of at least $3\times10^{-3}$ N/m can provide satisfactory results, a spring constant of at least $4\times10^{-3}$ N/m, or at least $5\times10^{-3}$ N/m, or at least $6\times10^{-3}$ N/m being particularly suitable. It is assumed that the spring constant of the elastic edge needs be at most equivalent to the spring constant of the ITM to which it is attached. In the present case, a spring constant of at most $20\times10^{-3}$ N/m, or at most $15\times10^{-3}$ N/m, at most $10\times10^{-3}$ N/m, is believed to be appropriate for suitably elastic edges.

Printing systems of the invention may be used to print on web substrates as well as sheet substrates, as described above. In web printing systems, there are no grippers on the impression cylinder and there need not be a gap between the ends of blanket wrapped around the pressure cylinder. Instead, the pressure cylinder may be formed with an outer made of a suitable compressible material.

To print on both sides of a web, two separate printing systems may be provided, each having its own print heads, intermediate transfer member, pressure cylinder and impression cylinder. The two printing systems may be arranged in series with a web reversing mechanism between them.

In an alternative embodiment, a double width printing systems may be used, this being equivalent to two printing systems arranged in parallel rather than in series with one another. In this case, the intermediate transfer member, the print bars, and the impression station are all at least twice as wide as the web and different images are printed by the two halves of the printing system straddling the centerline. After having passed down one side of the printing system, the web is inverted and returned to enter the printing system a second time in the same direction but on the other side of the printing system for images to be printed on its reverse side.

When printing on a web, powered dancers may be needed to position the web for correct alignment of the printing on opposite sides of the web and to reduce the empty space between printed images on the web.

The above description is simplified and provided only for the purpose of enabling an understanding of the present invention. For a successful printing system, the physical and chemical properties of the inks, the chemical composition and possible treatment of the release surface of the belt and the control of the various stations of the printing system are all important but need not be considered in detail in the present context.

Such aspects are described and claimed in other applications of the same Applicant which have been filed or will be filed at approximately the same time as the present application. Further details on aqueous inks that may be used in a printing system according to the present invention are disclosed in WO 2013/132439. Belts and release layers thereof that would be suitable for such inks are disclosed in WO 2013/132432 and WO 2013/132438. The elective pre-treatment solution can be prepared according to the disclosure of WO 2013/132339. Appropriate belt structures and methods of installing the same in a printing system according to the invention are detailed in WO 2013/136220, while exemplary methods for controlling such systems are provided in WO 2013/132424. Additionally, the operation of the present printing system may be monitored through displays and user interface as described in WO 2013/132356.

The contents of all of the above mentioned applications of the Applicant are incorporated by reference as if fully set forth herein.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "an impression station" or "at least one impression station" may include a plurality of impression stations.

The invention claimed is:

1. A printing system comprising:

a. an intermediate transfer member (ITM) comprising an endless flexible belt;

b. a treatment station for applying a solution of PEI (polyethyleneimine) to an outer surface of the ITM so as to pre-treat the ITM outer surface;

c. an image forming station at which droplets of an aqueous ink comprising an aqueous carrier are applied to the pre-treated outer surface of the intermediate transfer member so as to form ink images upon the ITM;

d. a drying station at which the ITM and the ink images thereon are heated so as to evaporate the aqueous carrier from the ink images to leave a residue film, the drying station being spaced from the image forming station;

e. an impression station at which the residue film is transferred to a sheet or web substrate, the impression station being spaced from the drying station, wherein the impression station comprises an impression cylinder and a pressure cylinder for urging the belt against the impression cylinder to cause the residue film resting on the outer surface of the belt to be transferred onto the substrate that passes between the belt and the impression cylinder, wherein the system is configured such that the solution of PEI is evaporated prior to the formation of the ink images so that the ITM outer surface is substantially dry when the droplets of an aqueous ink are applied thereto.

2. A method for printing using a printing system that includes a rotating intermediate transfer member (ITM) comprising an endless flexible belt, the method comprising:

a. at a treatment station, applying a solution of PEI (polyethleneimine) to an outer surface of the ITM so as to pre-treat the ITM outer surface;

b. applying droplets of an aqueous ink comprising an aqueous carrier to the pre-treated outer surface of the ITM, so as to form ink images upon the rotating ITM, wherein (i) the solution of PEI is evaporated prior to the formation of the ink images so that the ITM outer surface is substantially dry when the droplets of an aqueous ink are applied thereto and (ii) the droplets of the aqueous ink are applied at the image forming station;

c. at a drying station spaced from the image forming station, heating the ITM and the ink images thereon so as to evaporate the aqueous carrier from the ink images to leave a residue film; and d. at an impression station spaced from the drying station, transferring the residue film to a sheet or web substrate, the impression station comprising an impression cylinder and a pressure cylinder, the pressure cylinder being configured to urge the belt against the impression cylinder so as to cause the residue film resting on the outer surface of the belt to be transferred onto the substrate that passes between the belt and the impression cylinder.

* * * * *